US012801296B2

(12) United States Patent
Tsuruya et al.

(10) Patent No.: US 12,801,296 B2
(45) Date of Patent: Nov. 17, 2026

(54) STORAGE SYSTEM AND A METHOD OF CONTROLLING ENERGY CONSUMPTION THEREIN

(71) Applicant: Hitachi Vantara, Ltd., Yokohama (JP)

(72) Inventors: Masahiro Tsuruya, Tokyo (JP); Tomohiro Yoshihara, Tokyo (JP); Norio Shimozono, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/978,311

(22) Filed: Dec. 12, 2024

(65) Prior Publication Data

US 2025/0173073 A1 May 29, 2025

Related U.S. Application Data

(63) Continuation of application No. 18/609,786, filed on Mar. 19, 2024, now Pat. No. 12,204,775.

(30) Foreign Application Priority Data

Nov. 24, 2023 (JP) ................................. 2023-199448

(51) Int. Cl.
*G06F 3/00* (2006.01)
*G06F 3/06* (2006.01)

(52) U.S. Cl.
CPC .......... *G06F 3/0625* (2013.01); *G06F 3/0634* (2013.01); *G06F 3/0683* (2013.01)

(58) Field of Classification Search
None
See application file for complete search history.

(56) References Cited

U.S. PATENT DOCUMENTS 8,365,000 B2 1/2013 Lee
11,966,272 B2 * 4/2024 Liang ........................ G06F 1/28
11,995,348 B2 5/2024 Cheong
(Continued)

FOREIGN PATENT DOCUMENTS

JP 2009009194 A 1/2009
WO 2018/193608 A1 10/2018

OTHER PUBLICATIONS

Japanese Office Action dated Jan. 27, 2026 for Japanese Patent Application No. 2024-088139.

*Primary Examiner* — Midys Rojas
(74) *Attorney, Agent, or Firm* — Volpe Koenig

(57) ABSTRACT

A storage system with reduced power consumption includes a storage apparatus that saves data in accordance with a data input/output request from a host or outputs the saved data, the storage system including a plurality of components each configured to operate in a first power mode or at least one second lower power mode in a switchable manner, a condition monitoring module monitoring each of the plurality of components, and a power mode control module that determines a power mode of at least one component to be the second power mode, according to a processing load related to each of the plurality of components and which corresponds to a result of monitoring by the condition monitoring module, and operates the at least one particular component in the power saving mode, in which the plurality of components perform mutual control with the storage apparatus in accordance with the data input/output request.

9 Claims, 26 Drawing Sheets

(56) References Cited

U.S. PATENT DOCUMENTS

| | | | |
|---|---|---|---|
| 2009/0006876 A1 | 1/2009 | Fukatani et al. | |
| 2024/0061591 A1* | 2/2024 | Cho | G06F 1/3228 |
| 2024/0177107 A1 | 5/2024 | Hirata et al. | |

* cited by examiner

FIG. 5

401

| DEVICE IDENTIFIER (TYPE) 501 | POWER CONTROL UNIT 502 | NORMAL MODE 503 | | POWER-OFF 504 | | POWER SAVING MODE A 505 | | POWER SAVING MODE B 506 | | ... |
|---|---|---|---|---|---|---|---|---|---|---|
| | | POWER CONSUMPTION | PROCESSING CAPABILITY | POWER CONSUMPTION | PROCESSING CAPABILITY | POWER CONSUMPTION | PROCESSING CAPABILITY | POWER CONSUMPTION | PROCESSING CAPABILITY | ... |
| CPU | PER CERTAIN DEVICE | 200W | 100% | 0W | 0% | 150W | 70% | 120W | 50% | ... |
| MEMORY | PER CONNECTION DESTINATION DEVICE | 5W | 100% | 0W | 0% | 5W | 60% | 3W | 50% | ... |
| HOST I/F (FC) | PER CERTAIN DEVICE | 20W | 100% | 0W | 0% | 15W | 70% | 12W | 50% | ... |
| HOST I/F (Ethernet) | PER CERTAIN DEVICE | 50W | 100% | 0W | 0% | 40W | 70% | 30W | 40% | ... |
| PDEV I/F | PER CERTAIN DEVICE | 25W | 100% | 0W | 0% | 20W | 75% | 15W | 50% | ... |
| ACCELERATOR | PER CONTROLLER | 30W | 100% | 0W | 0% | 25W | 70% | 20W | 50% | ... |
| NETWORK SWITCH | PER CERTAIN DEVICE | 15W | 100% | 0W | 0% | 12W | 70% | 10W | 50% | ... |
| PDEV SWITCH | PER CERTAIN DEVICE | 50W | 100% | 0W | 0% | 35W | 60% | 20W | 45% | ... |
| PDEV (SSD) | PER CERTAIN DEVICE | 10W | 100% | 0W | 0% | 7W | 60% | 6W | 50% | ... |
| PDEV (HDD) | PER CERTAIN DEVICE | 15W | 100% | 0W | 0% | - (UNSUPPORTED) | - (UNSUPPORTED) | - (UNSUPPORTED) | - (UNSUPPORTED) | ... |
| XYZ | - (NOT APPLICABLE TO POWER CONTROL) | 100W | 100% | - (UNSUPPORTED) | - (UNSUPPORTED) | - (UNSUPPORTED) | - (UNSUPPORTED) | - (UNSUPPORTED) | - (UNSUPPORTED) | ... |
| ... | ... | ... | ... | ... | ... | ... | ... | ... | ... | ... |

DEVICE MANAGEMENT TABLE

FIG. 6

402

| 601 SAMPLING TIME | 602 DEVICE IDENTIFIER (TYPE) | 603 MOUNTING CONTROLLER # | 604 MOUNTING POSITION IDENTIFIER | 605 MOUNTING STATUS | 606 POWER MODE | 607 PROCESSING LOAD |
|---|---|---|---|---|---|---|
| 2023/09/01 00:12:34 | CPU | 1 | A | MOUNTED | NORMAL MODE | 30% |
| 2023/09/01 00:12:34 | CPU | 1 | B | MOUNTED | NORMAL MODE | 50% |
| 2023/09/01 00:12:34 | MEMORY | 1 | A | MOUNTED | POWER SAVING MODE B | 30% |
| 2023/09/01 00:12:34 | MEMORY | 1 | B | MOUNTED | POWER SAVING MODE B | 30% |
| 2023/09/01 00:12:34 | MEMORY | 1 | C | MOUNTED | POWER SAVING MODE B | 30% |
| 2023/09/01 00:12:34 | MEMORY | 1 | D | MOUNTED | POWER SAVING MODE B | 30% |
| 2023/09/01 00:12:34 | MEMORY | 1 | E | UNMOUNTED | - | |
| 2023/09/01 00:12:34 | MEMORY | 1 | F | UNMOUNTED | - | |
| 2023/09/01 00:12:34 | MEMORY | 1 | G | MOUNTED | POWER SAVING MODE A | 45% |
| 2023/09/01 00:12:34 | MEMORY | 1 | H | MOUNTED | POWER SAVING MODE A | 45% |
| 2023/09/01 00:12:34 | MEMORY | 1 | I | MOUNTED | POWER SAVING MODE A | 45% |
| 2023/09/01 00:12:34 | MEMORY | 1 | J | MOUNTED | POWER SAVING MODE A | 45% |
| 2023/09/01 00:12:34 | MEMORY | 1 | K | UNMOUNTED | - | - |
| 2023/09/01 00:12:34 | MEMORY | 1 | L | UNMOUNTED | - | - |
| 2023/09/01 00:12:34 | HOST I/F (FC) | 1 | A | MOUNTED | POWER SAVING MODE A | 60% |
| 2023/09/01 00:12:34 | HOST I/F (Ether) | 1 | B | MOUNTED | POWER SAVING MODE B | 35% |
| 2023/09/01 00:12:34 | HOST I/F (FC) | 1 | C | MOUNTED | POWER-OFF | 0% |
| ... | HOST I/F (-) | 1 | D | UNMOUNTED | - | - |
| ... | ... | ... | ... | ... | ... | ... |
| 2023/09/01 00:12:34 | CPU | 2 | A | MOUNTED | NORMAL MODE | 40% |
| 2023/09/01 00:12:34 | CPU | 2 | B | MOUNTED | NORMAL MODE | 35% |
| ... | ... | ... | ... | ... | ... | ... |
| 2023/09/01 00:12:35 | CPU | 1 | A | MOUNTED | POWER SAVING MODE A | 35% |
| 2023/09/01 00:12:35 | CPU | 1 | B | MOUNTED | POWER SAVING MODE A | 45% |
| ... | ... | ... | ... | ... | ... | ... |

DEVICE OPERATION HISTORY TABLE

FIG. 19

1801

| CONTROLLER IDENTIFIER (1901) | NORMAL MODE (1902) | | POWER-OFF (1903) | | STANDBY MODE (1904) | | POWER SAVING MODE A (1905) | | POWER SAVING MODE B (1906) | | ... |
|---|---|---|---|---|---|---|---|---|---|---|---|
| | POWER CONSUMPTION | PROCESSING CAPABILITY | POWER CONSUMPTION | PROCESSING CAPABILITY | POWER CONSUMPTION | PROCESSING CAPABILITY | POWER CONSUMPTION | PROCESSING CAPABILITY | POWER CONSUMPTION | PROCESSING CAPABILITY | ... |
| ABC_1 | 500W | 100% | 0W | 0% | 50W | 0% | 400W | 70% | 350W | 50% | ... |
| ABC_2 | 500W | 100% | 0W | 0% | 50W | 0% | 400W | 70% | 350W | 50% | ... |
| ABC_3 | 500W | 100% | 0W | 0% | 50W | 0% | 400W | 70% | 350W | 50% | ... |
| ABC_4 | 500W | 100% | 0W | 0% | 50W | 0% | 400W | 70% | 350W | 50% | ... |
| ... | ... | ... | ... | ... | ... | ... | ... | ... | ... | ... | ... |

STORAGE CONTROLLER MANAGEMENT TABLE

FIG. 20

1802

| SAMPLING TIME (2001) | CONTROLLER IDENTIFIER (2002) | STATUS (2003) | POWER MODE (2004) | PROCESSING LOAD (2005) |
|---|---|---|---|---|
| 2023/10/01 12:12:34 | ABC_1 | NORMAL | NORMAL MODE | 15% |
| 2023/10/01 12:12:34 | ABC_2 | NORMAL | NORMAL MODE | 12% |
| 2023/10/01 12:12:34 | ABC_3 | NORMAL | NORMAL MODE | 14% |
| 2023/10/01 12:12:34 | ABC_4 | NORMAL | NORMAL MODE | 13% |
| ... | ... | ... | ... | 30% |
| 2023/10/01 12:12:35 | ABC_1 | NORMAL | POWER SAVING MODE A | 27% |
| 2023/10/01 12:12:35 | ABC_2 | NORMAL | POWER SAVING MODE A | 28% |
| 2023/10/01 12:12:35 | ABC_3 | NORMAL | STANDBY MODE | 0% |
| 2023/10/01 12:12:35 | ABC_4 | NORMAL | POWER-OFF | 0% |
| ... | ... | ... | ... | ... |
| 2023/10/01 13:00:10 | ABC_1 | ABNORMAL | - | - |
| 2023/10/01 13:00:10 | ABC_2 | NORMAL | NORMAL POWER MODE | 55% |
| 2023/10/01 13:00:10 | ABC_3 | NORMAL | STANDBY MODE | 0% |
| 2023/10/01 13:00:10 | ABC_4 | NORMAL | POWER-OFF | 0% |
| ... | ... | ... | ... | ... |
| 2023/10/01 13:00:15 | ABC_1 | ABNORMAL | - | - |
| 2023/10/01 13:00:15 | ABC_2 | NORMAL | POWER SAVING MODE A | 27% |
| 2023/10/01 13:00:15 | ABC_3 | NORMAL | POWER SAVING MODE A | 28% |
| 2023/10/01 13:00:15 | ABC_4 | NORMAL | STANDBY MODE | 0% |
| ... | ... | ... | ... | ... |

STORAGE CONTROLLER OPERATION HISTORY TABLE

FIG. 21A

1803

CONTROLLER POWER SETTING INFORMATION TABLE

| POWER SAVING MODE SETTING (2101) | REDUNDANCY SET VALUE (2102) | POWER CONSUMPTION UPPER LIMIT VALUE (2103) |
|---|---|---|
| OFF | - | - |

FIG. 21B

1803

CONTROLLER POWER SETTING INFORMATION TABLE

| POWER SAVING MODE SETTING (2101) | REDUNDANCY SET VALUE (2102) | POWER CONSUMPTION UPPER LIMIT VALUE (2103) |
|---|---|---|
| AUTOMATIC | REDUNDANCY 1 | - |

FIG. 21C

1803

CONTROLLER POWER SETTING INFORMATION TABLE

| POWER SAVING MODE SETTING (2101) | REDUNDANCY SET VALUE (2102) | POWER CONSUMPTION UPPER LIMIT VALUE (2103) |
|---|---|---|
| SPECIFIED | REDUNDANCY 1 | 1,500 W |

STORAGE SYSTEM AND A METHOD OF CONTROLLING ENERGY CONSUMPTION THEREIN

CROSS REFERENCE TO RELATED APPLICATIONS

This application is a continuation of U.S. patent application Ser. No. 18/609,786, filed Mar. 19, 2024, which claims the benefit of Japanese Patent Application No. 2023-199448, filed Nov. 24, 2023, the entire contents of which are incorporated herein by reference.

BACKGROUND OF THE INVENTION

1. Field of the Invention

The present invention relates to a storage system and a power consumption suppressing method, and is suitably applied to, for example, a storage system related to a technology for suppressing power consumption according to a power mode of each device mounted in at least one controller.

2. Description of the Related Art

In recent years, a technology that is represented by Artificial Intelligence (AI) and that creates new values by accumulating and analyzing enormous amount of data has become increasingly important. This requires a storage system having high Input/Output (I/O) performance in order to accumulate an enormous amount of data and to analyze the accumulated data.

Meanwhile, to provide a high-performance storage system, a Central Processing Unit (CPU) and an I/O module mounted in a storage system are configured to provide high performance. Accordingly, the power consumption of the storage system is on the increase year by year, and to reduce environmental loads and power costs, a control technology making both high performance and energy saving compatible has been demanded. For power control of the storage system, PCT Patent Publication No. WO2018/193608 (Patent Document 1) discloses a technology that solves the problem of increasing power consumption of a Solid State Drive (SSD).

In the technology disclosed in Patent Document 1, the SSD is provided with a function to limit power consumption and performance, and for performance and power requirements (product specifications such as a maximum configuration) for a mounted storage system, power mode settings are predetermined. Moreover, the technology disclosed in Patent Document 1 takes action to enable operation within the range of power that can be supplied to the storage system, by determining the power modes for the SSD and the CPU according to the configuration and load state of the SSD.

SUMMARY OF THE INVENTION

However, the technology disclosed in Patent Document 1 takes action against increasing power consumption of the SSD but fails to address increased power for various components mounted in the storage system. As a result, the technology fails to reduce the power consumption of the whole storage system. To reduce the power for the storage system, devices that provide low processing performance but have low power consumption may be adopted for the various components. However, any of these devices may degrade the I/O performance.

In view of the above-described circumstances, an object of the present invention is to propose a storage system and a power consumption suppressing method that enable a reduction in power consumption without degrading the I/O performance between a host and the storage system.

To accomplish the object, the present invention provides a storage system including a storage apparatus that saves data in accordance with a data input/output request from a host or outputs the saved data, the storage system including a plurality of components each configured to operate in a first power mode or at least one second power mode in a switchable manner, the second power mode consuming less power than the first power mode, a condition monitoring module that monitors an operating condition of each of the plurality of components, and a power mode control module that determines a power mode of at least one particular component to be the second power mode according to a processing load which is related to each of the plurality of components and which corresponds to a result of monitoring by the condition monitoring module, and that operates the at least one particular component in the power saving mode, in which the plurality of components perform mutual control with the storage apparatus in accordance with the data input/output request.

Further, the present invention provides a power consumption suppressing method for a storage system including a storage apparatus that saves data in accordance with a data input/output request from a host or outputs the saved data, the power consumption suppressing method including a condition monitoring step of monitoring, by a condition monitoring module, an operating condition of each of a plurality of components each configured to operate in a first power mode or at least one second power mode in a switchable manner, the second power mode consuming less power than the first power mode, and a power mode control step of determining, by a power mode control module, a power mode of at least one particular component to be the second power mode according to a processing load which is related to each of the plurality of components and which corresponds to a result of monitoring by the condition monitoring step, and operating the at least one particular component in the power saving mode, in which the plurality of components perform mutual control with the storage apparatus in accordance with the data input/output request.

According to the present invention, power consumption can be reduced without reducing input/output performance between the host and the storage apparatus.

BRIEF DESCRIPTION OF THE DRAWINGS

FIG. 5 is a diagram illustrating a configuration example of a device management table;

FIG. 6 is a diagram illustrating a configuration example of a device operation history table;

FIG. 19 is a diagram illustrating a configuration example of a controller management table depicted in FIG. 18;

FIG. 20 is a diagram illustrating a configuration example of a controller operation history table depicted in FIG. 18;

FIG. 21A is a diagram illustrating a setting example of a controller power setting information table depicted in FIG. 18;

FIG. 21B is a diagram illustrating a setting example of the controller power setting information table depicted in FIG. 18;

FIG. 21C is a diagram illustrating a setting example of the controller power setting information table depicted in FIG. 18;

DESCRIPTION OF THE INVENTION

Figure 1:
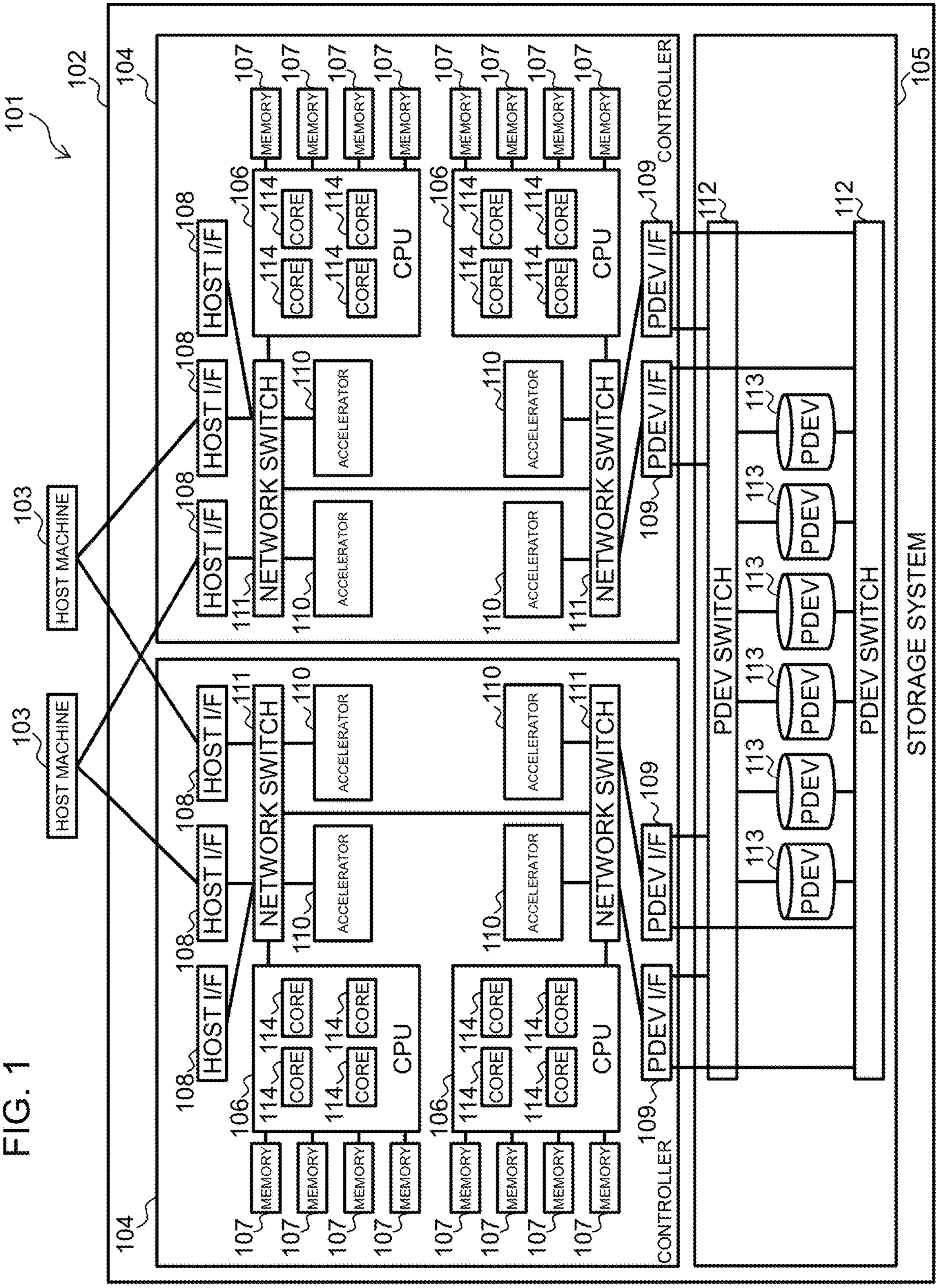
FIG. 1 is a system configuration diagram illustrating a configuration example of an information system including a storage system according to the present embodiment.

An embodiment of the present invention will be described below in reference to the drawings.

Various pieces of information may be described below with use of the expression "xxx table." However, the various pieces of information may be expressed using a data structure other than the table. To indicate independence from the data structure, the "xxx table" may be referred to as "xxx information."

Further, in the description below, names and alphanumeric characters will be used as identification information for elements. However, other types of identification information (symbols or the like) may be used.

Further, in the description below, in a case where elements of the same type are described without being distinguished from one another, a common symbol among reference symbols (or the reference symbols) may be used. In a case where elements of the same type are described while being distinguished from one another, the reference symbols (or Identities (IDs) of the elements) may be used.

Further, in the description below, a "memory" is a main storage apparatus in a general computer system and may be one or more storage devices. For example, the memory is at least a main storage device (typically, a volatile storage device) of the main storage device and an auxiliary storage device (typically, a nonvolatile storage device).

Further, in the description below, "PDEV" means a physical storage device, and may typically be a nonvolatile storage device (for example, an auxiliary storage device). A PDEV may be, for example, a Hard Disk Drive (HDD) or a Solid State Drive (SSD).

Further, in the description below, each of the devices constituting the storage system has a function to allow power consumption and processing capability to be adjusted, and levels to which the power consumption and processing capability can be adjusted are referred to as "power modes." In the description below, the "power mode" is indicated by one of defined finite levels. However, the "power level" may be adjusted steplessly.

Further, in the description below, in a case where processing is described using a "program" as a subject, the subject of the processing may be a storage controller or a processor (for example, a CPU) included in the storage controller because the program is executed by the processor to perform defined processing with use of a storage resource (for example, a main storage) and/or a communication interface apparatus as appropriate. In addition, the storage controller may include a hardware circuit executing a part or all of the processing. A computer program may be installed from a program source. The program source may be, for example, a program distribution server or a computer readable storage medium.

Further, in the description below, a "host" is a "host system" that transmits an I/O request to the storage system and may include an interface device, a storage device as exemplified by a memory, for example and a processor connected to the interface device and the storage device. A host system may include one or more host computers. The at least one host computer may be a physical computer and may include a virtual host computer in addition to a physical host computer.

(1) First Embodiment

FIG. 1 is a system configuration diagram illustrating a configuration example of an information system 101 including a storage system 102 according to the present embodiment. The information system 101 includes one or more storage systems 102 and one or more host machines 103.

The storage system 102 includes one or more controllers 104 and one or more PDEV BOXes 105. The PDEV BOX 105 includes one or more PDEV switches 112 and one or more PDEVs 113. In FIG. 1, the controller 104 and the PDEV BOX 105 are directly connected together but may be connected via an unillustrated network.

The controller 104 includes a CPU 106, a memory 107, a host Interface (I/F) 108, a PDEV I/F 109, an accelerator 110, and a network switch 111. In the present embodiment, a "device" refers to each of the CPU 106, the memory 107, the host I/F 108, the PDEV I/F 109, the accelerator 110, and the network switch 111 included in the controller 104. Note that the devices mounted in the controller 104 are not limited to the above-described devices, and may include other devices, for example, devices related to a power supply.

The controller 104 is equipped with, as a device as described above, for example, a plurality of devices as an example of a plurality of components which have a normal power mode (first power mode), at least one power saving mode (second power mode) having lower power consumption than the normal power mode, a power OFF (power OFF mode) that turns off power, and a standby mode (third power mode), to which one of the plurality of modes is applied in a switchable manner, and which are each operable. The controller 104 controls data input/output processing (I/Os) between the controller 104 and the host machine 103 by a plurality of devices.

The CPU 106 includes one or more cores 114 to control the whole controller 104. The CPU 106 operates according to a microprogram stored in the memory 107.

The host I/F 108 is controlled by the CPU 106 to meet an I/O request from the host machine 103 or perform transmission and reception of I/O data, for example. The PDEV I/F 109 is controlled by the CPU 106 to perform transmission and reception of data to and from the PDEV 113 and the like via the PDEV switch 112 of the PDEV BOX 105.

The storage system 102 includes logical volumes in which data can be stored, and the controller 104 executes data input/output processing.

Note that, in the present embodiment, the CPU 106, the host I/F 108, the PDEV switch 112, and the accelerator 110 are connected together via the network switch 111 but may be directly connected together without the intervention of the network switch 111. The memory 107 is connected directly to the CPU 106 but need not be connected directly and may, for example, be connected to the CPU 106 via the network switch 111. Further, the controllers 104 are connected together via the network switch 111, but may be connected together without the intervention of the network switch 111 by directly coupling the CPUs 106 together. Further, the PDEV 113 is connected to the PDEV I/F 109 via the PDEV switch 112. However, the PDEV 113 may be connected to the PDEV I/F 109 without the intervention of the PDEV switch 112.

In the storage system 102 as described above, when, under the control of the CPU 106 via the network switch 111, the host I/F 108 receives an I/O request or transmission or reception of I/O data from the host machine 103, the CPU 106 controls the PDEV I/F 109 via the network switch 111 to execute data input/output processing on the PDEV 113 via the PDEV switch 112 of the PDEV BOX 105. In this case, in the controller 104, each device set to a predetermined power mode consumes power according to the power mode. The CPU 106 constantly monitors the operating condition of each device to acquire operation information indicative of the operating condition of each device.

Figure 2:
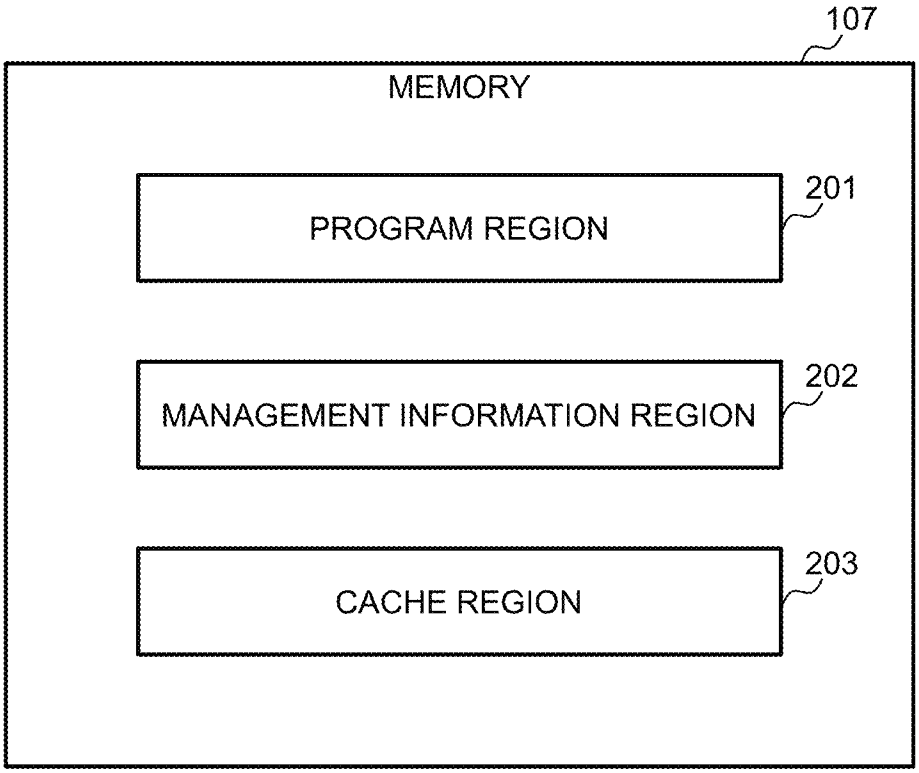
FIG. 2 is a diagram illustrating a configuration example of a memory depicted in FIG. 1.

FIG. 2 is a diagram illustrating a configuration example of the memory 107 depicted in FIG. 1.

The memory 107 is provided with a program region 201, a management information region 202, and a cache region 203. The program region 201 is a region in which each program for the CPU 106 to execute processing is stored.

The management information region 202 is a region which is accessed by the CPU 106 and in which various management tables are stored. The cache region 203 is a region in which data is temporarily stored when the host I/F 108, the PDEV I/F 109, and the like transfer data.

Figure 3:
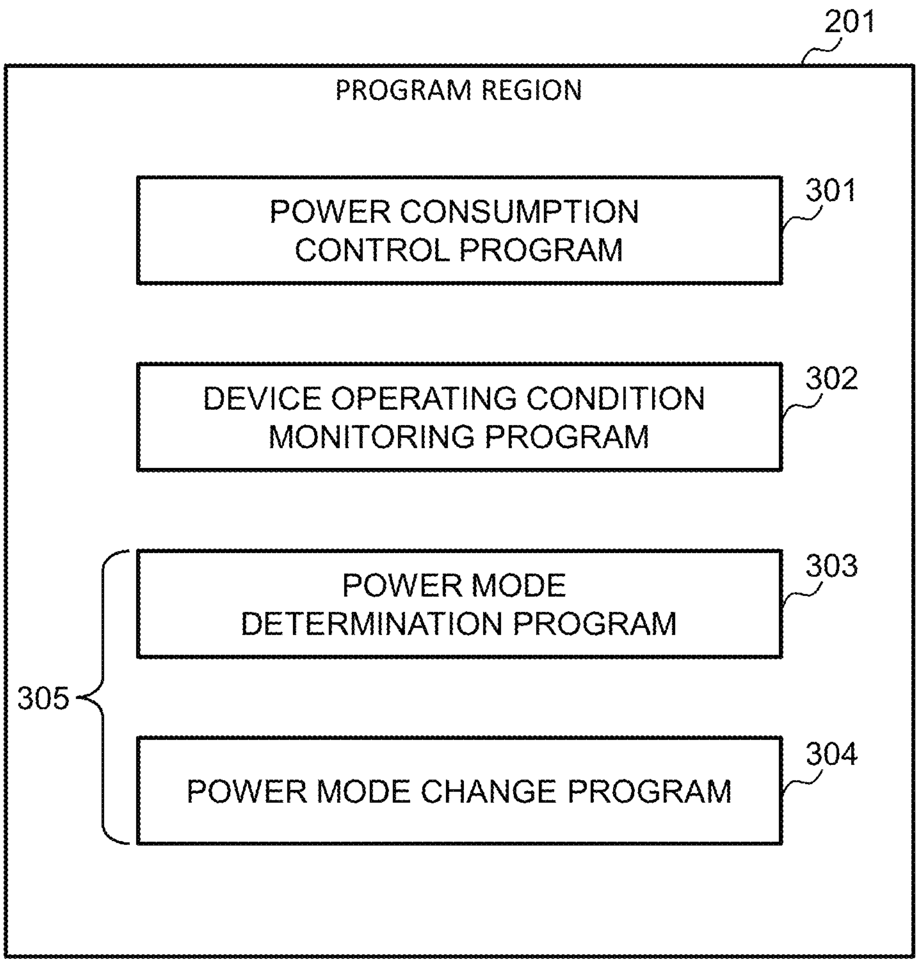
FIG. 3 is a diagram illustrating a configuration example of a program region depicted in FIG. 2.

FIG. 3 is a diagram illustrating examples of programs stored in the program region 201 depicted in FIG. 2. The programs stored in the program region 201 include, for example, a power consumption control program 301, a device operating condition monitoring program 302, and a power mode determination program 303 and a power mode change program 304 that are used as an example of a power mode control module 305. In the description below, in a case where the power mode determination program 303 and the power mode change program 304 need not be distinguished from each other, the description may use the power mode control module 305.

The power consumption control program 301 controls the power consumption of various devices mounted in the controller 104 of the storage system 102. The power consumption control program 301 controls the power consumption of the various devices by changing the power modes of the various devices. The power consumption control program 301 controls the device operating condition monitoring program 302 and the power mode control module 305.

The device operating condition monitoring program 302 is an example of a condition monitoring module and monitors the operating conditions of a plurality of devices.

The power mode control module 305 switches the power mode of at least one particular device of the plurality of devices that has a low processing load, according to the result of monitoring by the device operating condition monitoring program 302, and operates the particular device. This allows power consumption to be suppressed.

In the present embodiment, the plurality of components are a plurality of devices that control data input/output processing between the storage system and the host. The controller 104 includes at least one controller 104 including the plurality of devices and controlling the data input/output processing between the storage system and the host by the plurality of devices, and the power mode control module 305. The controller 104 includes the device operating condition monitoring program 302 acting as an example of a condition monitoring module, and the power mode determination program 303 and the power mode change program 304 included in the power mode control module 305. Note that controlling the input/output processing as used here is not limited to specific I/O processing and may include, for example, providing the function of a communication channel, intervening in exchanges between the storage system and the host, and the like.

As described above, the power mode control module 305 includes the power mode determination program 303 and the power mode change program 304. The power mode determination program 303 is an example of a power mode determination module and determines the power mode of a particular device of the plurality of devices to be, for example, the normal mode in a case where, for example, a change of the power mode of the particular device to the power saving mode is determined not to affect the data input/output processing between the storage system and the host machine 103. The power mode change program 304 is an example of a power mode change module, and switches the power mode of the particular device to the determined power saving mode. Note that the case where a change of the power mode to the power saving mode is determined not to affect data input/output processing between the storage system and the host machine 103 as described above includes, for example, the influence of a change of the power mode of the particular device to the power saving mode on the data input/output processing between the storage system and the host machine 103 being equal to or lower than a predefined criterion. Note that the setting of the criterion may be determined according to the characteristics of each device.

By executing the power consumption control program 301, the storage system 102 can reduce power consumption without degrading the I/O performance of the storage system 102. Further, during processing, the power consumption control program 301 invokes the device operating condition monitoring program 302 that monitors the processing load on the device and that stores history information and the power mode determination program 303 that determines the power mode of each device in reference to the history information described above and the like. Further, during processing, the power mode determination program 303 invokes the power mode change program 304 that performs processing required to change the power mode of the device and that changes the power mode of the device to the determined power mode.

Figure 4:
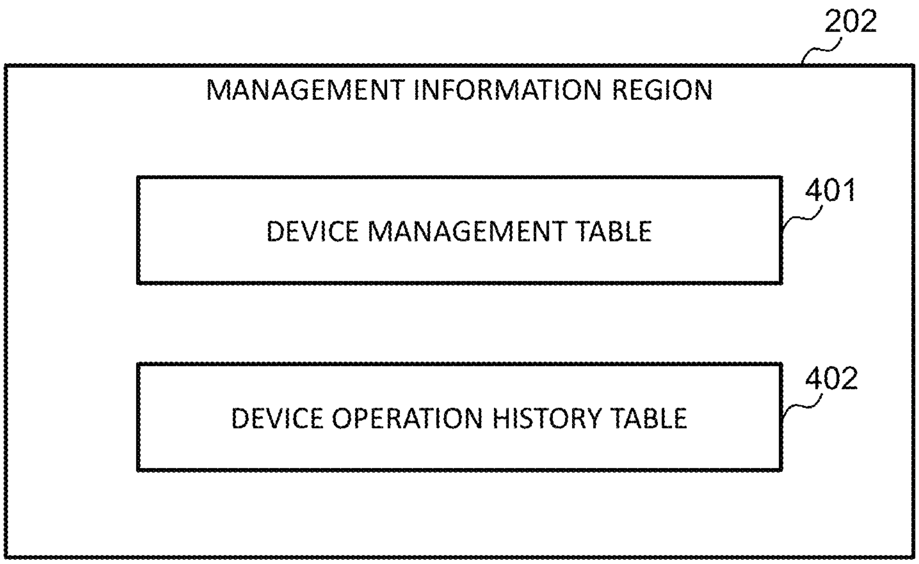
FIG. 4 is a diagram illustrating a configuration example of a management information region depicted in FIG. 2.

FIG. 4 is a diagram illustrating an example of information stored in the management information region 202.

In the management information region 202, a device management table 401 and a device operation history table 402 are stored.

The device management table 401 manages information related to a plurality of devices such as the CPU 106 which constitutes the storage system 102. The device management table 401 is used for processing of determining the power mode as described later.

The device operation history table 402 includes history information such as processing loads from past to present on the devices such as the CPU 106 which constitutes the storage system 102. The device operation history table 402 is used for the processing of determining the power mode. The device operation history table 402 manages the operating condition of a plurality of devices monitored by the device operating condition monitoring program 302.

For the plurality of devices managed in the device management table 401, in a case of determining, in reference to the operating conditions of the plurality of devices managed in the device operation history table 402, that the influence of a change of the power mode of the particular device to the power saving mode on the data input/output processing between the storage system and the host machine 103 is equal to or lower than the criterion, the power mode determination program 303 described above determines to change the power mode of the particular device to the power saving mode.

FIG. 5 is a diagram illustrating a configuration example of the device management table 401. The device management table 401 manages, for each group of the plurality of devices, at least power consumption and processing capability in each of the normal power mode and the power saving mode. According to the power consumption and the processing capability in each of the normal power mode and the power saving mode for each group of the plurality of devices managed in the device management table 401, the power mode control module 305 described above determines the power saving mode for the power mode of the particular device described above, and changes the power mode of the particular device to the power saving mode. This will be more specifically described below.

The device management table 401 includes entries of a device identifier (type) 501, a power control unit 502, a normal mode 503, power-OFF 504, a power saving mode A 505, and power saving mode B 506.

The device identifier (type) 501 is the identifier of each of the devices such as the CPU 106 and the host I/F 108 which are mounted in the storage system 102.

As described above, the device management table 401 manages, for a plurality of devices, the power control unit 502 related to the range in which the devices are related to other devices in terms of control of power consumption. In other words, the power control unit 502 is information used to manage and define, for the power mode, a category in which control of the power mode for the plurality of devices is performed independently of control of the power mode for other devices (first category) and a category in which control of the power mode for the plurality of devices is performed in combination with control of the power mode for other devices (second category). The power control unit 502 indicates which unit is used to control a change of the power mode of each device. In the present embodiment, the power control units include, for example, a device unit, a connection destination device unit, and a controller unit.

Note that, in the present embodiment, such power control units are illustrative, and while detailed descriptions will be given below, the device management table 401 may manage, as power control units, a device unit including devices independent from the other devices in terms of power consumption, a connection destination device unit including devices for which the power mode is to be changed in line with the other devices, and a controller unit including a group of controllers (for example, the accelerator 110) in which each group of the plurality of controllers 104 is to provide similar performance.

The normal mode 503, the power-OFF 504, the power saving mode A 505, and the power saving mode B 506 indicate the power modes of the devices mounted in the storage system 102, and each include power consumption and processing capability (relative value when the value in the normal mode is 100%)

Note that the present embodiment can provide, for example, four power modes but may provide at least two power modes. Further, the number of corresponding power modes may vary among the devices or any of the devices may not include a plurality of power modes. Furthermore, the present embodiment includes the two items of power consumption and processing capability but may include other types of information required in selecting the power mode, such as constraints required when the power mode is used (for example, the functions are limited).

FIG. 6 is a diagram illustrating a configuration example of the device operation history table 402. The device operation history table 402 includes entries of a sampling time 601, a device identifier (type) 602, a mounting controller #603, a mounting position identifier 604, mounting status 605, a power mode 606, and a processing load 607. Note that, in the present embodiment, "#" denotes an identification number.

The sampling time 601 indicates the time when the history of the device was sampled, for example, the time elapsed since activation of the storage system 102. The device identifier (type) 602 is the identifier of each of the devices such as the CPU 106 and the host I/F 108 which are mounted in the storage system 102. The device identifier (type) 602 indicates a correspondence relation with the device identifier (type) 501 in the device management table 401.

The mounting controller #603 is an identifier identifying the controller 104 in which the device is mounted. The mounting position identifier 604 is an identifier used in a case where a plurality of the devices are mounted and indicates where the devices are mounted. The mounting status 605 indicates whether or not the device is mounted.

The power mode 606 indicates the power mode of the device, and is one of the normal mode 503, the power-OFF 504, the power saving mode A 505, and the power saving mode B 506 of the device management table 401. The processing load 607 indicates a processing load on the device.

Note that, in the present embodiment, the type of the device is identified using the device identifier (type) 602, the mounting controller #603, and the mounting position identifier 604 but the present embodiment is not limited to this and any other method may be used to identify the device, for example, non-overlapping identifiers such as the serial numbers of the devices may be used.

Figure 7:
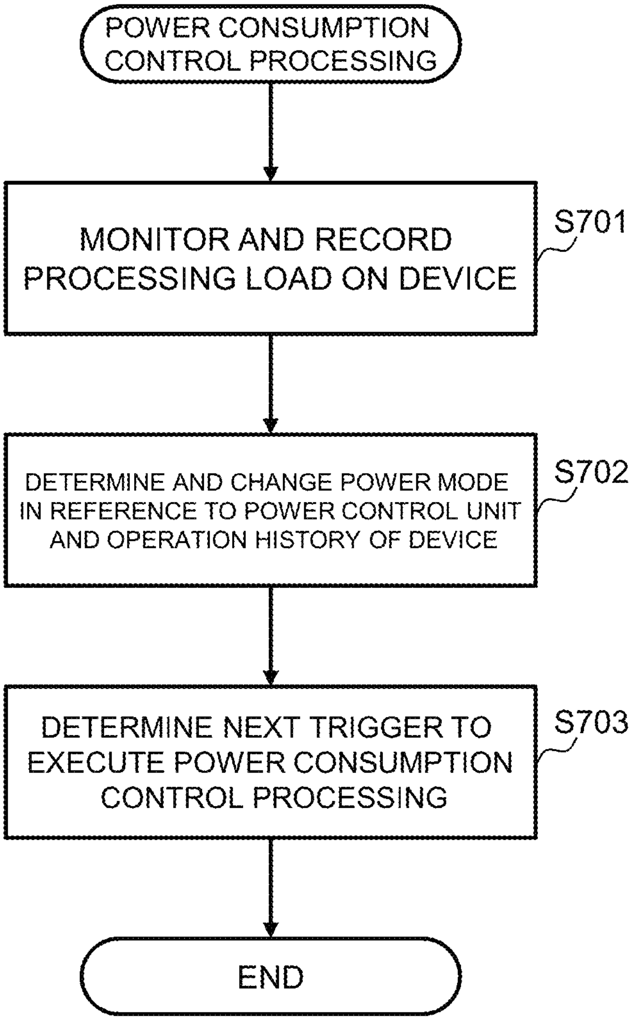
FIG. 7 is a diagram illustrating an example of a procedure of power consumption control processing.

FIG. 7 is a flowchart illustrating an example of a procedure of power consumption control processing intended to reduce power consumption in the storage system 102. The power consumption control processing mainly includes the following three steps. Note that the power consumption control processing is executed by each program depicted in FIG. 3 under the control of the CPU 106 when the storage system 102 is activated.

First, an outline of the power consumption suppressing method according to the present embodiment will be provided. The power consumption suppressing method is a power consumption suppressing method for a storage system including a storage apparatus that saves data in accordance with a data input/output request from a host or that outputs the saved data. The power consumption suppressing method includes a condition monitoring step of monitoring, by the device operating condition monitoring program 302 as an example of a condition monitoring module, an operating condition of each of a plurality of devices each configured to operate in a normal power mode or at least one power saving mode in a switchable manner, the power saving mode consuming less power than the normal power mode, and a power mode control step of determining, by the power mode control module 305, a power mode of at least one particular device to be the power saving mode according to a processing load which is related to each of the plurality of devices and which corresponds to a result of monitoring by the condition monitoring step, and operating the at least one particular device in the power saving mode, in which the plurality of devices perform mutual control with the storage apparatus in accordance with the data input/output request. An example of the power consumption control processing will specifically be described below.

In the present embodiment, for example, when the storage system 102 is started up, the CPU 106 executes the power consumption control program 301 stored in the program region 201 of the memory 107. When the power consumption control program 301 is executed, during the execution, the device operating condition monitoring program 302, the power mode determination program 303, and the power mode change program 304 are executed.

First, in a first step, the CPU 106 monitors the processing loads on the devices mounted in the storage system 102, and records the processing loads in the device operation history table 402 (step S701). More specifically, the CPU 106 starts executing processing the substance of which is performed by the power consumption control program 301 in response to, for example, satisfaction of a criterion (trigger) predefined for execution of the power consumption control processing. Further, in parallel, the CPU 106 can acquire the sampling time 601 corresponding to the monitoring of the operating condition related to the device described below. According to the progress of processing of the power consumption control program 301, the CPU 106 reads the device operating condition monitoring program 302 from the program region 201 of the memory 107 and runs the device operating condition monitoring program 302 to execute the device operating condition monitoring processing of monitoring the processing load related to a device to be monitored. The device operating condition monitoring program 302 accesses the device management table 401 to acquire the information concerning the device identifier 501 and the power control unit 502. According to the device identifier 501 and the power control unit 502, the device operating condition monitoring program 302 performs checks of the processing load and the power mode currently being applied. The device operating condition monitoring program 302 records the information concerning the power mode and the information regarding the processing load obtained as a result of performance of the checks, in the device operation history table 402, together with the corresponding device identifier 602, the identification information (mounting controller #603) regarding the controller to which the device identifier 602 belongs, the mounting position identifier 604, the mounting status 605, the sampling time 601, and the like. Note that the present processing will be described in further detail.

In a second step, the CPU 106 (power mode control module 305) references the device management table 401 and the device operation history table 402 to determine the power mode of each device according to the power control unit 502 and the operation history of the device and determine and change the power mode as necessary. According to the determination by the power mode determination program 303, the power mode change program 304 changes the power mode of the device as necessary (step S702). Specifically, the CPU 106 reads and executes the power mode determination program 303 as a part of processing of the power consumption control program 301. The power mode determination program 303 accesses the device operation history table 402 in the management information region 202 to acquire related information and determines the power mode to be applied to each device. Then, the CPU 106 reads and executes the power mode change program 304 as a part of processing of the power consumption control program 301. The power mode change program 304 transmits the power mode determined by the power mode determination program 303 to the target device identified in reference to the device identifier 501, the power control unit 502, the mounting controller #603, and the mounting position identifier 604 to cause the target device to change the power mode. Note that, when the target device characteristically includes no function to actively limit power consumption and has the power consumption determined by the usage of the target device by the CPU 106 and other devices, the CPU 106 limits the usage according to the power mode. Note that the present processing will be described in further detail below.

In a third step, the CPU 106 determines the next trigger to execute the power consumption control processing and ends the processing (step S703). Note that the next trigger for execution may be, for example, the elapse of a certain amount of time or one or more conditions such as the host machine 103 making an I/O request and mounting or removal of any device being set.

Figure 8:
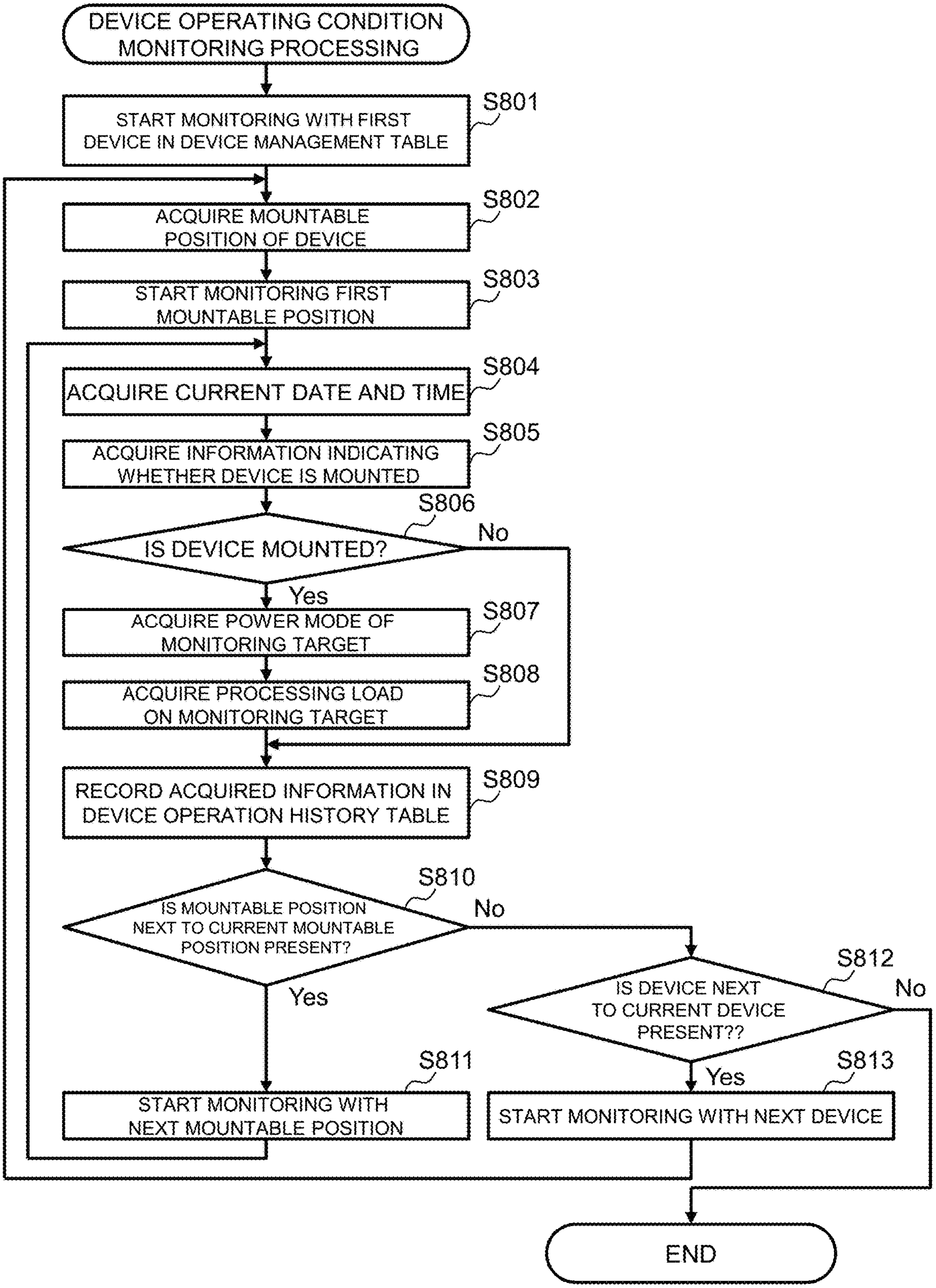
FIG. 8 is a diagram illustrating an example of a procedure of device operating condition monitoring processing.

FIG. 8 is a flowchart illustrating an example of a procedure of device operating condition monitoring processing performed in the power consumption control processing in the storage system 102. Under the control of the CPU 106, the device operating condition monitoring program 302 references the device management table 401 and starts monitoring with the device in the first row (step S801). Note that, in this case, monitoring is started with the device in the first row but the order is not limited to this.

The device operating condition monitoring program 302 acquires the mountable position of the device (step S802). The mountable position means information used to distinguish, in a case where a plurality of the same devices are mounted in the storage system 102, the devices from one another. For example, this corresponds to the mounting controller #603 and the mounting position identifier 604 in the device operation history table 402.

The device operating condition monitoring program 302 starts monitoring using, as a target, the first mountable position in the list of the mountable positions for the device acquired in step S802 (step S803).

The device operating condition monitoring program 302 acquires the current date and time (step S804). Note that the date and time acquired in this case is information corresponding to the sampling time 601 in the device operation history table 402 and may be, for example, a point of time or the time elapsed since the activation of the storage system 102.

The device operating condition monitoring program 302 acquires information indicating whether or not the targeted device is mounted at the mountable position for the device (step S805). Note that, for information indicating whether the device is mounted, a table including information regarding the mounting of the device may be prepared and referenced, or the mounting of the device may be checked by accessing the device at this point of time, or the like.

According to the result in step S805, the device operating condition monitoring program 302 determines whether or not the targeted device is mounted at the mountable position for the device (step S806). In a case where the result of the determination indicates that the device is mounted (step S806: Yes), step S807 is executed. On the other hand, in a case where the result of the determination indicates that the device is not mounted (step S806: No), step S809 is executed.

The device operating condition monitoring program 302 acquires the current power mode of the monitoring target device (step S807). Note that, for the power mode of the device, a table including the current power mode of the device may be prepared and referenced, or the current power mode of the device may be checked by accessing the device at this point of time, or the like.

The device operating condition monitoring program 302 acquires the current processing load on the monitoring target device (step S808). Note that, for the processing load on the device, a table in which the processing load is periodically recorded may be prepared and referenced, or the processing load may be checked by accessing the device at this point of time, or the like. For a method of calculating the processing load on the device, several existing techniques are available. Thus, any one of these techniques may be used.

The device operating condition monitoring program 302 records, in the device operation history table 402, the information acquired in step S804, step S805, step S807, and step S808 (step S809).

The device operating condition monitoring program 302 references the list of the mountable positions for the device acquired in step S802, to determine whether or not any mountable position next to the currently targeted mountable position is present (step S810). In a case where the result f the determination indicates that the next mountable position is present (step S810: Yes), step S811 is executed. On the other hand, in a case where the result of the determination indicates that no next mountable position is present (step S810: No), step S812 is executed.

The device operating condition monitoring program 302 references the list of the mountable positions for the device acquired in step S802, and starts monitoring using, as a target, the mountable position next to the currently targeted mountable position (step S811). Subsequently, step S804 is executed.

The device operating condition monitoring program 302 references the device management table 401 to determine whether or not any device next to the currently targeted device is present (step S812). In a case where the result of the determination indicates that the device next to the currently targeted device is present (step S812: Yes), step S813 is executed. In a case where the result of the determination indicates that no device next to the currently targeted device is present (step S812: No), the device operating condition monitoring program 302 ends the device operating condition monitoring processing.

The device operating condition monitoring program 302 references the device management table 401 and starts monitoring using, as a target, the device next to the currently targeted device (step S813). Subsequently, step S802 is executed.

Now, classification of the devices in connection with the power mode in the present embodiment will be described. The power mode determination program 303 (power mode control module 305) described above may classify a plurality of devices into devices that are subjected to grouping and that have a low level of independence in terms of control of power consumption for the plurality of devices, and devices that are not subjected to grouping and that have a high level of independence in terms of control of power consumption for the plurality of devices. For the devices that can be subjected to the grouping and for the devices that cannot be subjected to the grouping, the power mode may be switched to the power saving mode depending on the result of monitoring by the device operating condition monitoring program 302. Note that the “independence” in terms of control of power consumption may be interpreted to be the degree of coupling with another device in terms of function and performance based on the processing executed by each device, the performance of the device, or the content of cooperation with another device in processing. Controlling power consumption, that is, restricting power consumption, affects the performance of the target device. However, the range of the influence varies depending on the functions of the device or the relation with another device. In the present embodiment, in regard to the degree of coupling between a plurality of devices, the power control unit is defined according to the range determined by setting boundaries at a low degree of coupling (high level of independence) (that is, within the range, independence is at a low level). For example, the devices can be defined as follows: devices that have a high level of independence as single devices and that have a low necessity of being grouped (first category) and combination devices that have, as single devices, a low level of independence from other devices but when viewed as a combination (group) with the other devices, have a higher level of independence in terms of the relation with the other devices outside the combination (second category). Note that the criterion for the determination related to the independence may be optionally set and which of the categories includes each device is predefined according to required performance.

Further, in a case where there are a plurality of devices that can be subjected to the grouping, the power mode determination program 303 (power mode control module 305) may classify the devices into a first device group in which the manner of changing the power mode is to be the same for the plurality of devices subjected to the grouping and a second device group in which the manner of changing the power mode need not be the same for the plurality of devices subjected to the grouping, and for the first device group, may change the power modes of the devices to the same changed power mode.

Moreover, the power mode determination program 303 (power mode control module 305) may classify the devices into devices that accept power-OFF as a power saving mode and devices that do not accept power-OFF as a power saving mode (for example, a connected host I/F) (this may be determined, for example, in step S1008 in FIG. 10), and for the devices that accept power-OFF as a power saving mode, may switch the power mode to power-OFF depending on the result of monitoring by the device operating condition monitoring program 302, while switching, for the devices that do not accept power-OFF as a power saving mode, the power mode to the above-described power saving mode (not including power-OFF) depending on the result of monitoring by the device operating condition monitoring program 302.

Figure 9:
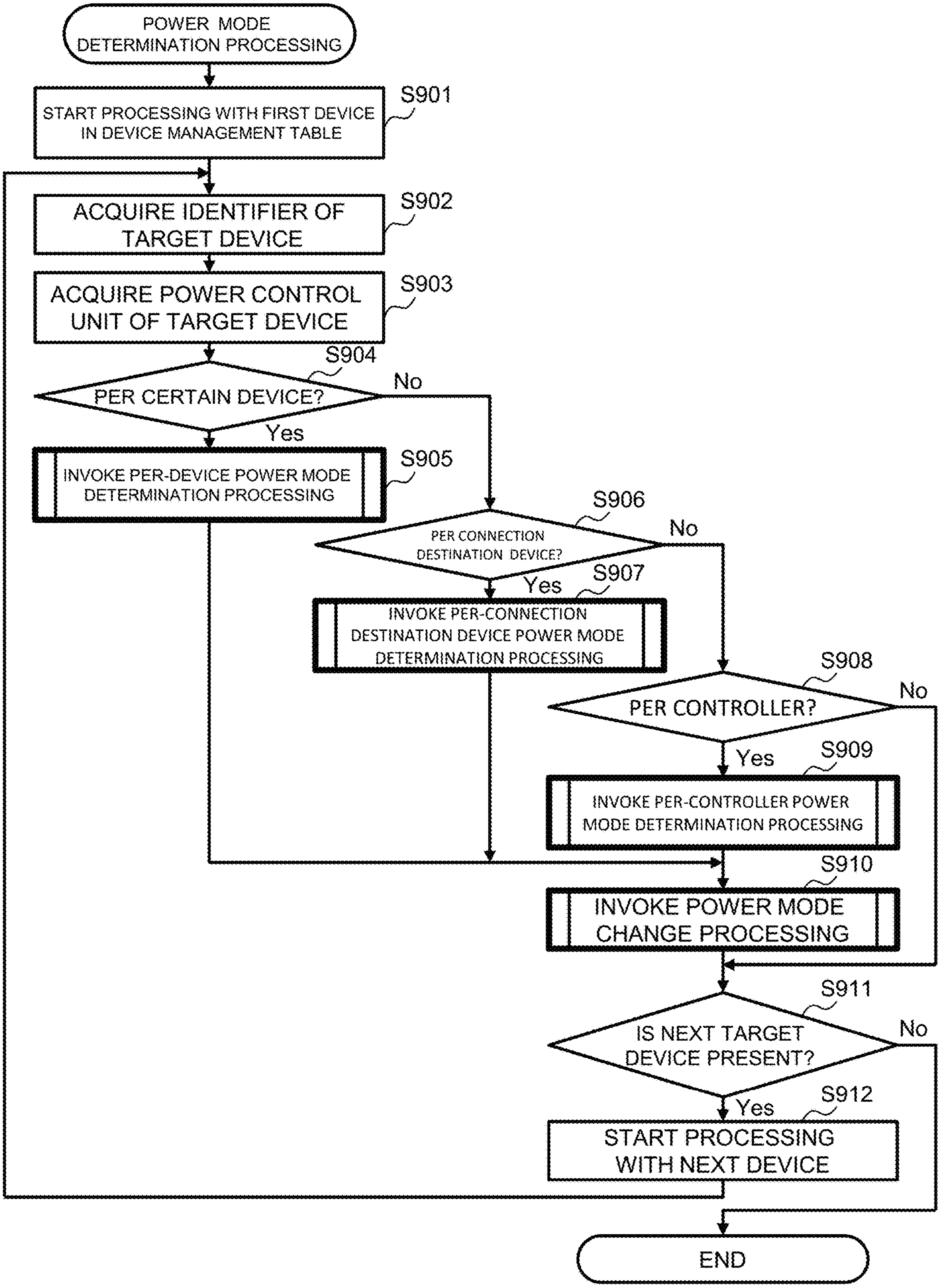
FIG. 9 is a flowchart an example of a procedure of per-connection destination device power mode determination processing.

FIG. 9 is a flowchart illustrating an example of the procedure of the power mode determination processing performed in the power consumption control processing. Under the control of the CPU 106, the power mode determination processing is executed by the power mode determination program 303.

The power mode determination program 303 references the device management table 401 and starts monitoring with the device in the first row (step S901). Note that, in this case, monitoring is started with the device in the first row but the order is not limited to this.

The power mode determination program 303 acquires the device identifier (type) 501 of the target device (step S902). The power mode determination program 303 acquires the power control unit 502 of the target device (step S903).

In reference to the information acquired in step S903, the power mode determination program 303 determines whether or not the power control unit 502 is per certain device (step S904). In a case where the result of the determination indicates that the power control unit 502 is per certain device (step S904: Yes), step S905 is executed. On the other hand, in a case where the result of the determination indicates that the power control unit 502 is not per certain device (step S904: No), step S906 is executed. The power mode determination program 303 invokes the per-device power mode determination processing (step S905). Subsequently, step S910 is executed.

In reference to the information acquired in step S903, the power mode determination program 303 determines whether or not the power control unit 502 is per connection destination device (step S906). In a case where the result of the determination indicates that the power control unit 502 is per connection destination device (step S260: Yes), step S907 is executed. On the other hand, in a case where the result of the determination indicates that the power control unit 502 is not per connection destination device (step S260: No), step S908 is executed. The power mode determination program 303 invokes per-connection destination device power mode determination processing (step S907). Subsequently, step S910 is executed.

In reference to the information acquired in step S903, the power mode determination program 303 determines whether or not the power control unit 502 is per controller (step S908). In a case where the result of the determination indicates that the power control unit 502 is per controller (step S908: Yes), step S909 is executed. On the other hand, in a case where the result of the determination indicates that the power control unit 502 is not per controller (step S908: No), step S911 is executed. The power mode determination program 303 invokes per-controller power mode determination processing described below (step S909). Subsequently, step S910 is executed.

According to the power mode determined in step S905, step S907, or step S909, the power mode determination program 303 invokes power mode change processing of changing the power mode of the target device (step S910). Subsequently, step S911 is executed.

The power mode determination program 303 references the device management table 401 and determines whether or not any device next to the current target device is present (step S911). In a case where the result of the determination indicates that the device next to the current target device is present (step S911: Yes), step S912 is executed. On the other hand, in a case where the result of the determination indicates that no device next to the current target device is present (step S911: No), the power mode determination program 303 ends the power mode determination processing.

The power mode determination program 303 references the device management table 401 and starts processing using, as a target, the device next to the current target device (step S912). Subsequently, step S902 is executed.

Figure 10:
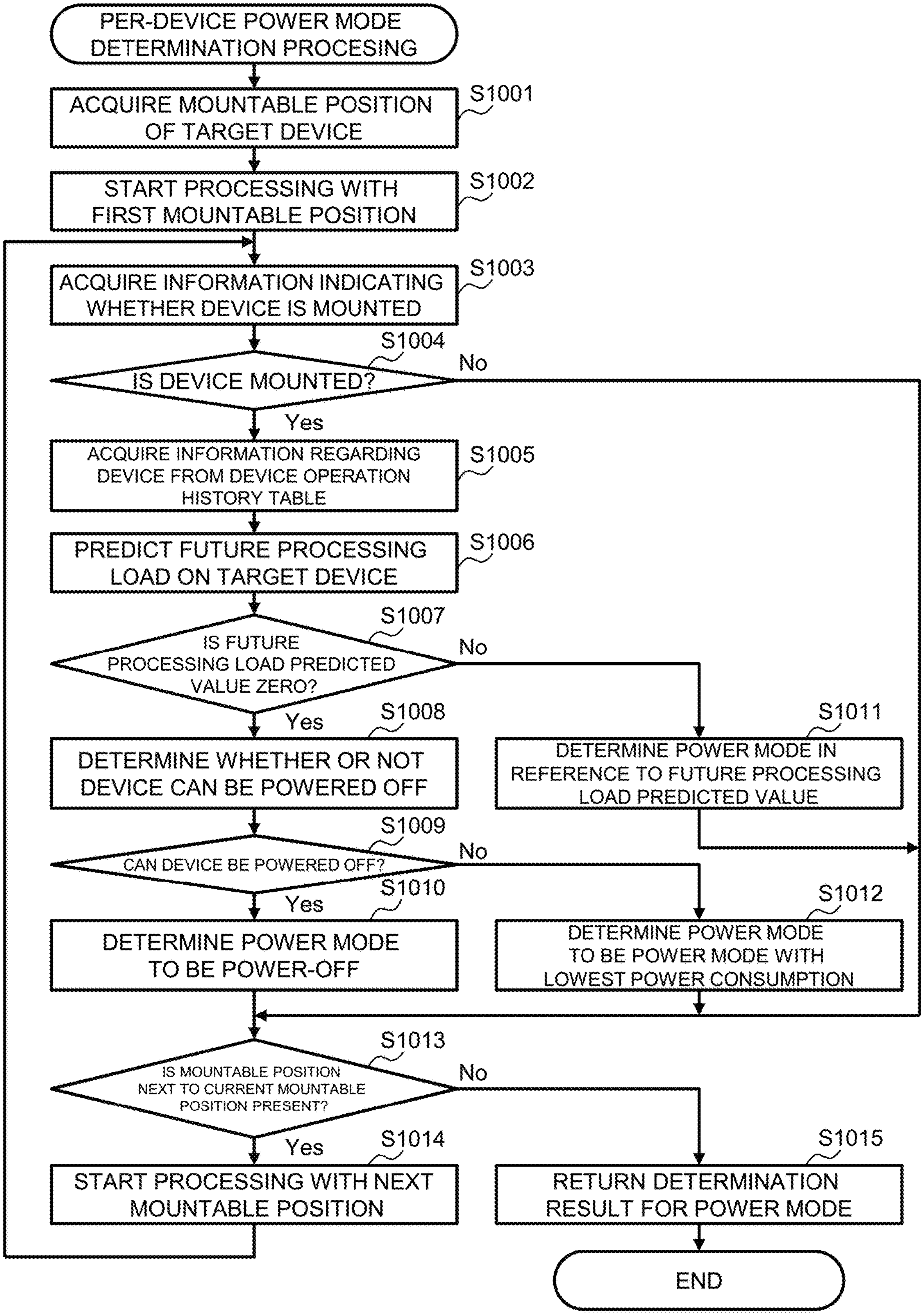
FIG. 10 is a flowchart illustrating an example of a procedure of per-device power mode determination processing depicted in FIG. 9.

FIG. 10 is a flowchart illustrating an example of the procedure of the per-device power mode determination processing depicted in FIG. 9. The per-device power mode determination processing is processing invoked from the device power mode determination processing performed in the power consumption control processing in the storage system 102. Under the control of the CPU 106, the per-device power mode determination processing is executed by the power mode determination program 303.

The power mode determination program 303 acquires mountable positions for the device (step S1001). The mountable position means information used to distinguish a plurality of the same devices from one another in a case where the storage system 102 is equipped with the devices. For example, this corresponds to the mounting controller #603 and the mounting position identifier 604 in the device operation history table 402.

The power mode determination program 303 starts processing using, as a target, the first mountable position in the list of the mountable positions for the device acquired in step S1001 (step S1002).

The power mode determination program 303 acquires information indicating whether or not the targeted device is mounted at the mountable position for the device (step S1003). Note that, for information indicating whether the device is mounted, a table including information regarding the mounting of the device may be prepared and referenced, or the mounting of the device may be checked by accessing the device at this point of time, or the like.

The power mode determination program 303 determines, in reference to the result of step S1003, whether or not the device is mounted at the mountable position of the targeted device (step S1004). In a case where the result of the determination indicates that the device is mounted at the mountable position (step S1004: Yes), step S1005 is executed. On the other hand, in a case where the result of the determination indicates that the device is not mounted at the mountable position (step S1004: No), step S1013 is executed.

The power mode determination program 303 references the device operation history table 402 and acquires information used to predict the processing load related to the device (step S1005).

The power mode determination program 303 uses the information acquired in step S1005, to predict the future processing load on the device (step S1006). This prediction result is hereinafter referred to as the "predicted value of the future processing load." For example, acquiring the sampling time 601 and the processing load 607 makes it possible to chronologically check a variation in the processing load of the device and to predict the future processing load. Note that information other than the information acquired in step S1005 may be used to predict the future processing load. For example, the information that may be used includes the amount of change in the number of logical volumes defined in the storage system 102, the amount of change in the number of hosts connected, and the like. Further, as a method for predicting the future processing load, the future processing load may be predicted from the past operation history or from the latest operating condition.

The power mode determination program 303 determines, in reference to the result of step S1006, whether or not the predicted value of the future processing load on the device is zero (step S1007). In a case where the result of the determination indicates that the predicted value of the future processing load is zero (step S1007: Yes), the procedure proceeds to step S1008. On the other hand, in a case where the predicted value of the future processing load is not zero (step S1007: No), step S1011 is executed.

The power mode determination program 303 determines whether or not the power mode of the device can be set to power-OFF (step S1008). In some cases, the device cannot be set to power-OFF even though the predicted value of the future processing load is zero, and thus individual determination is required when the power mode is to be set to power-OFF. For example, in a case where the host I/F 108 is connected to the host machine 103, then even with the lack of an I/O request from the host machine 103, setting the power mode to power-OFF disconnects the host machine 103 from the host I/F 108, affecting the operation of the host machine 103. Further, in a case where the device requires time to transition from power-OFF to another power mode, then in some cases, the long transition time affects the I/O performance of the storage system. In the present processing, the above-described requirements are considered in a composite manner.

In reference to the result of the determination in step S1008, the power mode determination program 303 determines whether or not the power mode of the device can be set to power-OFF (step S1009). In a case where the result of the determination indicates that the power mode of the device can be set to power-OFF (step S1009: Yes), step S1010 is executed. On the other hand, in a case where the result of the determination indicates that the power mode of the device cannot be set to power-OFF (step S1009: Yes), step S1012 is executed.

The power mode determination program 303 determines the power mode of the device to be "power-OFF" (step S1010). Subsequently, step S1013 is executed.

In reference to the predicted value of the future processing load determined in step S1006, the power mode determination program 303 determines the power mode of the device (step S1011). Note that the present processing is assumed to select a power mode that can provide processing capability exceeding the predicted value of the future processing load of the device, while consuming the least power, so as not to affect the I/O performance of the storage system 102. Note that an operation mode of the storage system that tolerates degradation of the I/O performance may be prepared, and by selecting the operation mode, the user of the storage system 102 may determine the power mode with a reduction in power consumption prioritized. Subsequently, step S1013 is executed.

The power mode determination program 303 determines the power mode of the device to be one of the power modes that consumes the least power besides power-OFF (step S1012). As described above, in this case, the predicted value of the future processing load on the device is zero, but power-OFF cannot be selected. Subsequently, step S1013 is executed.

The power mode determination program 303 references the list of the mountable positions for the target device acquired in step S1001, to determine whether or not any mountable position next to the currently targeted mountable position is present (step S1013). In a case where the result of the determination indicates that the next mountable position is present (step S1013: Yes), step S1014 is executed. On the other hand, in a case where the result of the determination indicates that no next mountable position is present (step S1013: No), step S1015 is executed.

The power mode determination program 303 references the list of the mountable positions for the device acquired in step S1001 and starts processing using, as a target, the mountable position next to the currently targeted mountable position (step S1014). Subsequently, step S1003 is executed.

The power mode determination program 303 returns, to the invoker of the per-device power mode determination processing, the result of the determination of the power mode calculated in step S1010, step S1011, and step S1012, and ends the per-device power mode determination processing (step S1015).

Figure 11:
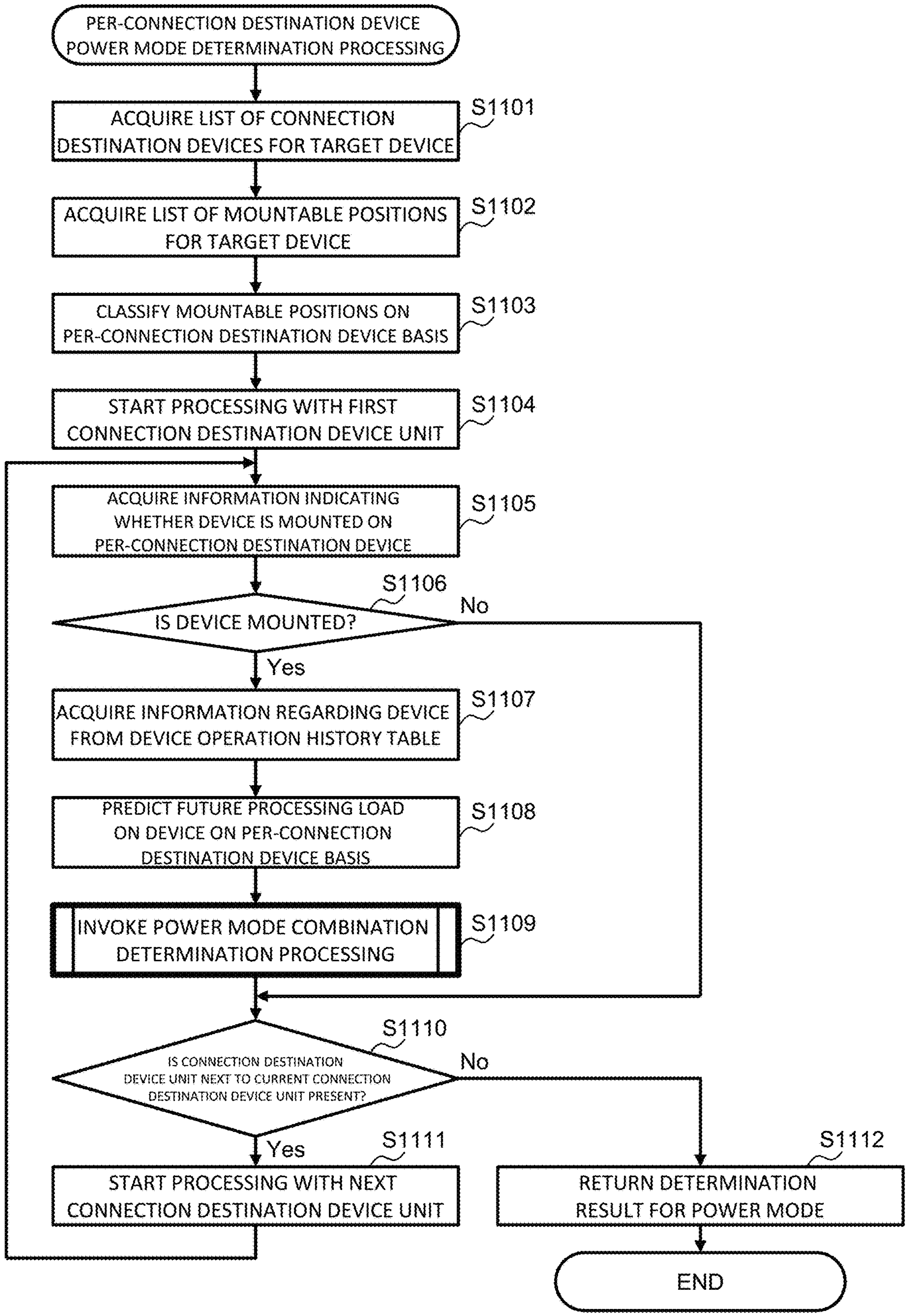
FIG. 11 is a diagram illustrating an example of a processing flow for determining a power mode on a per-connection-destination-device basis.

FIG. 11 is a flowchart illustrating an example of the procedure of per-connection destination device power mode determination processing depicted in FIG. 9. The per-connection destination device power mode determination processing is processing invoked from the device power mode determination processing performed in the power consumption control processing in the storage system 102.

Note that the difference between the per-connection destination device power mode determination processing and the per-device power mode determination processing in FIG. 10 is that the per-connection destination device power mode determination processing includes, instead of determining the power mode of each device, determining the combination of power modes for the combination of particular devices having a dependence relation as connection destination devices, in consideration of the combination of the particular devices. For example, the CPU 106 is a connection destination device for the memory 107, but in a certain case, the CPU 106 uses the memory 107 by, for example, interleave control. In this case, a plurality of memories 107 connected to the same CPU 106 need to have the same processing performance, in other words, the same power mode needs to be selected for the memories 107.

The power mode determination program 303 acquires a list of connection destination devices for the target device (step 1101). For the connection destination devices, a table including connection destination information for the device may be prepared and referenced, or the connection destinations may be checked by accessing the device at this point of time, or the like.

The power mode determination program 303 acquires the list of the mountable positions for the target device (step S1102). The mountable position means, in a case where a plurality of the same devices are mounted in the storage system 102, information for identifying the devices. For example, this applies to the mounting controller #603 and the mounting position identifier 604 in the device operation history table 402.

The power mode determination program 303 classifies the mountable positions on a per-connection-destination-device basis in reference to the results of step S1101 and step S1102 (step S1103).

The power mode determination program 303 starts processing using, as a target, the first mountable position in the list of per-connection-destination-device mountable positions, which is the result of step S1103 (step S1104).

The power mode determination program 303 acquires information indicating whether or not the device is mounted at the targeted per-connection-destination-device mountable position (step S1105). Note that, for whether the device is mounted, a table including mounting information for the device may be prepared and referenced, or whether the device is mounted may be checked by accessing the device at this point of time, or the like.

The power mode determination program 303 determines, in reference to the result of step S1105, whether or not the device is mounted at the per-connection-destination-device mountable position (step S1106). Note that, with at least one device mounted, the power mode determination program 303 determines that the device is mounted. In a case where the result of the determination indicates that the device is mounted (step S1106: Yes), step S1107 is executed. On the other hand, in a case where the result of the determination indicates that no device is mounted (step S1106: No), step S1110 is executed.

The power mode determination program 303 references the device operation history table 402 and acquires information used to predict the processing load related to the device (step S1107).

The power mode determination program 303 uses the information acquired in step S1107, to predict the future processing load on the device on a per-connection-destination-device basis (step S1108). For example, acquiring the sampling time 601 and the processing load 607 makes it possible to chronologically check a variation in the processing load of the device and to predict the future processing load. Note that information other than the information acquired in step S1107 may be used to predict the future processing load. For example, the information that may be used includes the amount of change in the number of logical volumes defined in the storage system 102, the amount of change in the number of hosts connected, and the like. Note that the procedure of the prediction method may be similar to the procedure depicted in FIG. 10.

In reference to the predicted value of the future processing load determined in step S1108, the power mode determination program 303 invokes processing of determining the combination of power modes for the device (power mode combination determination processing in FIG. 13 described below) (step S1109).

The power mode determination program 303 references the per-connection-destination-device list, which is the result of step S1103, and determines whether or not any connection destination device next to the currently targeted connection destination device is present (step S1110). In a case where the result of the determination indicates that the next connection destination device is present (step S1110: Yes), step S1111 is executed. On the other hand, in a case where the result of the determination indicates that no next connection destination device is present (step S1110: No), step S1112 is executed.

The power mode determination program 303 references the per-connection-destination-device list, which is the result of step S1103, and starts processing using, as a target, the connection destination device next to the currently targeted connection destination device (step S1111). Subsequently, step S1105 is executed.

The power mode determination program 303 returns, to the invoker of the per-connection-destination-device power mode determination processing, the determination result for the power mode calculated in step S1109 to end the -connection destination device power mode determination processing (step S1112).

Figure 12:
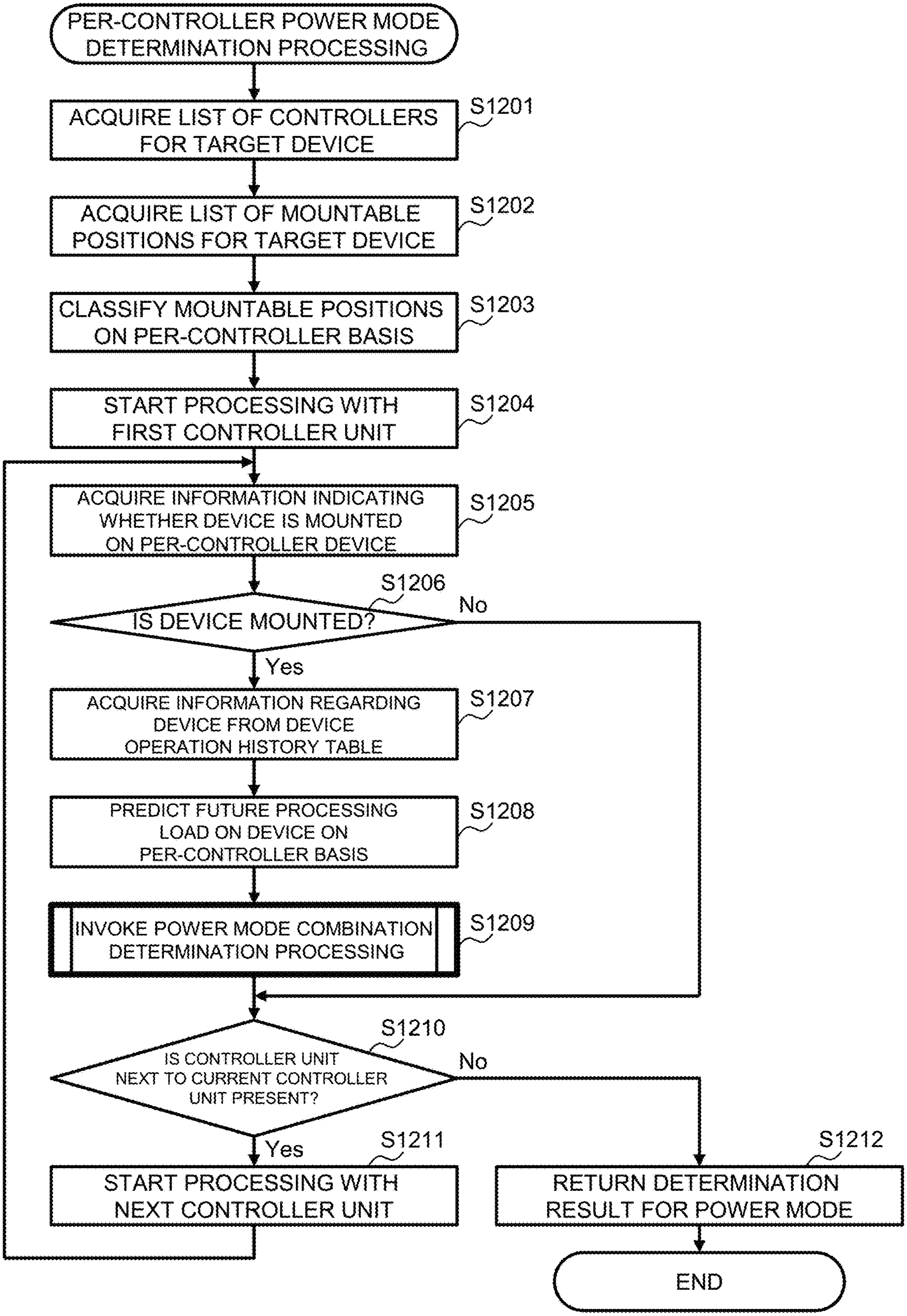
FIG. 12 is a flowchart illustrating an example of a procedure of per-controller power mode determination processing depicted in FIG. 9.

FIG. 12 is a flowchart illustrating an example of a procedure of per-controller power mode determination processing depicted in FIG. 9. The per-controller power mode determination processing is processing invoked from the power mode determination processing for the device performed in the power consumption control processing.

The only difference between the per-controller power mode determination processing and the per-connection destination device power mode determination processing in FIG. 11 is whether the connection destination device or the controller has a dependence relation, and thus detailed description is omitted. For example, the accelerator 110 is an example to which the per-controller power mode determination processing can be applied.

Four accelerators 110 are mounted in the controller 104, and the CPU 106 can optionally distribute or aggregate processing requests. In other words, in a case where the processing load on the accelerator 110 is low, the combination of the power modes is possible by, for example, a combination of stoppage of the processing request for a specific accelerator 110 and power-OFF.

Figure 13:
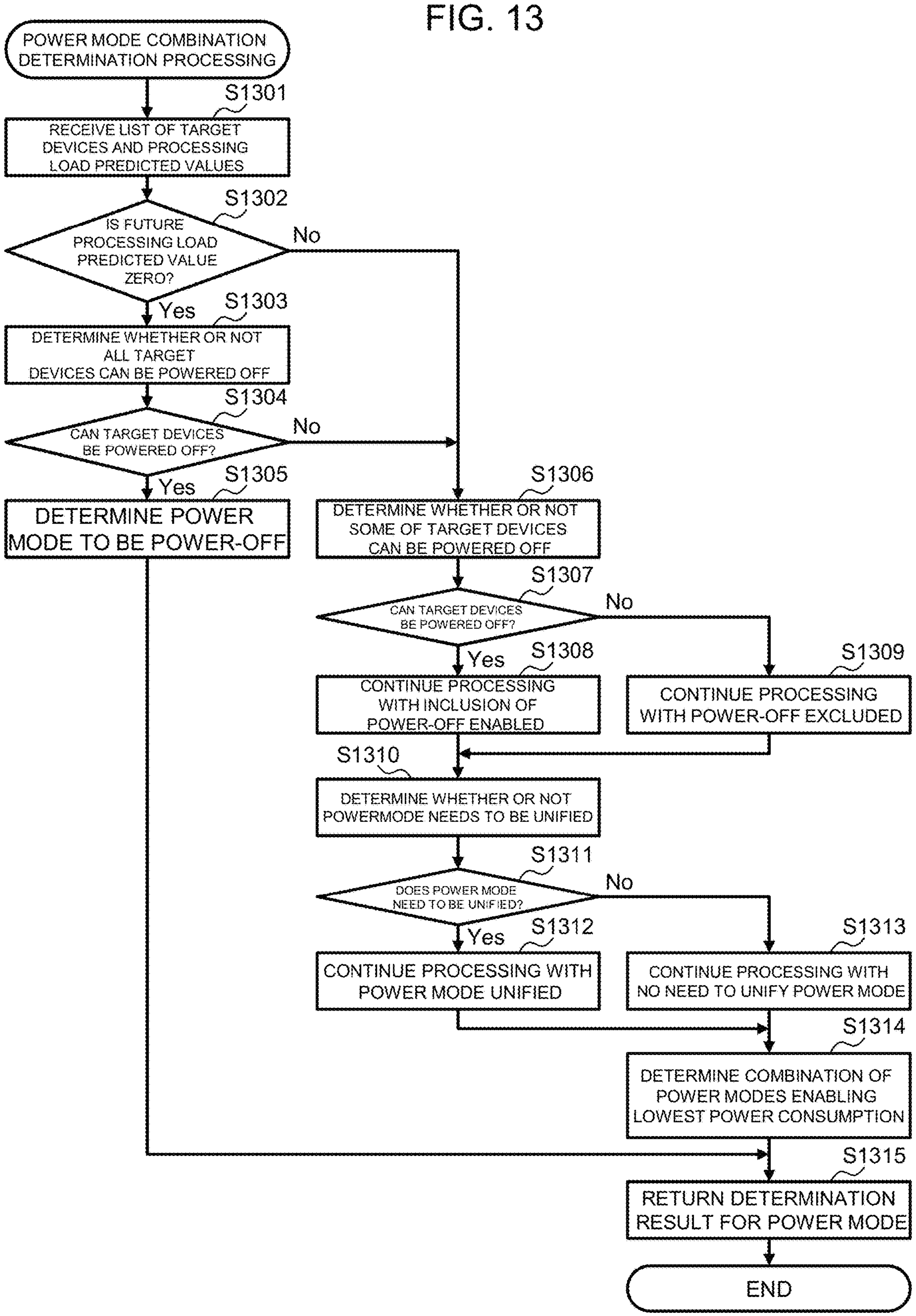
FIG. 13 is a flowchart illustrating an example of a procedure of a power mode combination determination processing.

FIG. 13 is a flowchart illustrating an example of a procedure of power mode combination determination processing. The power mode combination determination processing is processing invoked from a per-connection destination device power mode determination processing sequence and a per-controller power mode determination processing sequence. The power mode combination determination processing is related to the combination of the power modes and is thus invoked from step S1109 depicted in FIG. 11 and from step S1209 depicted in FIG. 12. Under the control of the CPU 106, the power mode determination program 303 executes the power mode combination determination processing.

In the present embodiment, in a case of tolerating, for a plurality of particular devices, the predicted value of the future processing load being zero and the power supply being turned OFF, the power mode determination program 303 determines to set the power mode to power-OFF for all of the plurality of particular devices when the power mode needs to be the same for all of the plurality of particular devices. Specific description will be provided below.

Due to processing by the invoker, the power mode determination program 303 receives the list of the target devices and the predicted values of the future processing loads (step S1301).

The power mode determination program 303 determines, in reference to the information received in step S1301, whether or not the future processing load value of the target device is zero (step S1302). In a case where the result of the determination indicates that the predicted value of the future processing load is zero (step S1302: Yes), step S1303 is executed. On the other hand, in a case where the result of the determination indicates that the predicted value of the future processing load is not zero (step S1302: No), step S1306 is executed.

The power mode determination program 303 determines whether or not power off of all of the target devices is possible (step S1303). Even in a case where the predicted value of the future processing load is zero, in some cases, not all of the target devices can be powered off, and determination is required. For example, in a case where the device requires time to transition from power-OFF to another power mode, then in some cases, powering all the devices off degrades the I/O performance of the storage system or causes timeout of the I/O processing due to a long transition time. In the present processing, these requirements are considered for determination.

The power mode determination program 303 determines, in reference to the result of step S1303, whether or not all of the target devices can be powered off (step S1304). In a case where the result of the determination indicates that all of the target devices can be powered off (step S1304: Yes), step S1305 is executed. On the other hand, in a case where the result of the determination indicates that not all of the target devices can be powered off (step S1304: No), step S1306 is executed.

The power mode determination program 303 determines the power mode of all of the target devices to be power-OFF (step S1305). Subsequently, step S1315 is executed.

The power mode determination program 303 determines whether or not some of the target devices can be powered off (step S1306). In some cases, some of the target devices cannot be powered off, and determination is required. In such cases, for example, the target devices are in some processing cooperation with one another, and the processing fails to be continued unless all the devices are in operation. In the present processing, these requirements are considered for determination.

The power mode determination program 303 determines, in reference to the result of step S1306, whether or not some of the target devices can be powered off (step S1307). In a case where the result of the determination indicates that some of the target devices can be powered off (step S1307: Yes), step S1308 is executed. On the other hand, in a case where the result of the determination indicates that some of the target devices cannot be powered off (step S1307: No), step S1309 is executed.

The power mode determination program 303 enables power OFF to be included in some of the target devices as a power mode, and continues the processing (step S1308). Subsequently, step S1310 is executed.

The power mode determination program 303 continues the processing with power-OFF prevented from being included as a power mode of the target device (step S1309). Subsequently, step S1310 is executed.

The power mode determination program 303 determines whether or not the power mode needs to be the same for all of the target devices (step S1310). For this determination, a table including information as to whether or not the power mode is the same for all of the target devices may be prepared and referenced, or the information may be checked by accessing the device at this point of time, or the like. For example, the CPU 106 is a connection destination device for the memory 107, but in a certain case, the CPU 106 uses the memory 107 by, for example, interleaving. In this case, a plurality of memories 107 connected to the same CPU 106 need to have the same processing performance, in other words, the same power mode needs to be set for the memories 107. Thus, determination is made with cooperation among the devices and the like considered.

The power mode determination program 303 determines, in reference to the result of step S1310, whether or not the power mode needs to be the same for all of the target devices (step S1311). In a case where the result of the determination indicates that the power mode needs to be the same for all of the target devices (step S1311: Yes), the procedure proceeds to step S1312. On the other hand, in a case where the result of the determination indicates that the power mode need not be the same for all of the target devices (step S1311: No), step S1313 is executed.

The power mode determination program 303 continues the processing with the power mode being the same for the target devices (step S1312). Subsequently, step S1314 is executed.

The power mode determination program 303 continues the processing with no need of the same power mode for the target devices (step S1313). Subsequently, step S1314 is executed.

In reference to the results of step S1301, step S1308, step S1309, step S1312, and step S1313, the power mode determination program 303 determines the combination of the power modes that allows power consumption to be minimized, to satisfy the requirements. For example, in some cases, when the processing loads can be concentrated on a particular device, a device that allows the processing load to be zeroed can be made, and combination with the power mode OFF allows provision of processing capability exceeding the predicted value of the future processing load while power consumption is reduced compared to uniformization of the processing loads among the devices.

For example, for the four accelerators 110, in a case where the predicted value of the future processing load value is 50% and the processing is evenly distributed among the four accelerators 110, the total power consumption is 20 W×4=80 W (average processing capability of 50%) because the accelerators 110 can operate in the power saving mode B 506. In contrast, in a case where the processing loads are concentrated on two accelerators 110 and control is performed to refrain from requesting processing from the two accelerators 110, the total power consumption is 30 W×2+0 W×2=60 W (average processing capability of 50%) because the accelerators 110 on which the processing loads are concentrated operate in the normal mode 503, whereas the remaining two accelerators 110 operate with the power-OFF 504. In a case where the requirements are satisfied, the latter combination of the power modes is selected.

Note that an operation mode of the storage system that tolerates degradation of the I/O performance may be prepared, and by selecting the operation mode, the user of the storage system 102 may determine the power mode with a reduction in power consumption prioritized. Subsequently, step S1315 is executed.

The power mode determination program 303 returns, to the invoker, the determination result for the power mode calculated in step S1305 or step S1314, to end the power mode combination determination processing (step S1315).

Figure 14:
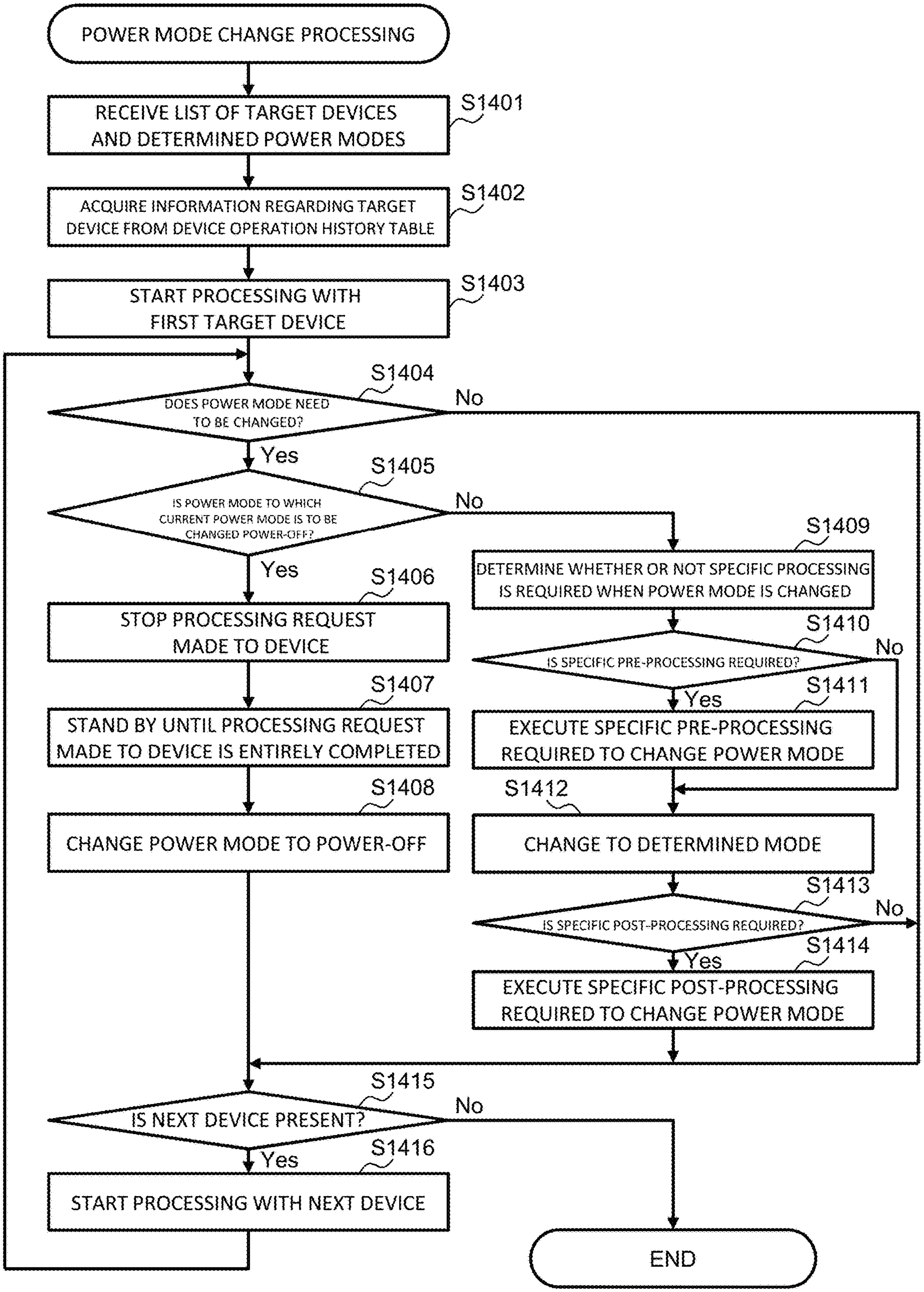
FIG. 14 is a flowchart illustrating an example of a procedure of power mode change processing.

FIG. 14 is a flowchart illustrating an example of a procedure of power mode change processing. The power mode change processing is processing invoked from the power mode determination processing for the device performed in the power consumption control processing described above. The power mode change processing is executed by the power mode change program 304 under the control of the CPU 106.

According to processing by the invoker, the power mode change program 304 receives the list of the target devices and the determined power modes (step S1401).

The power mode change program 304 acquires information related to the target devices from the device operation history table 402 (step S1402).

The power mode change program 304 starts the processing with the first target device in the list of the target devices received in step S1401 (step S1403).

In reference to the information related to the target device obtained in step S1401 and step S1402, the power mode change program 304 compares the current power mode with a changed power mode to determine whether or not the power mode of the target device needs to be changed (step S1404).

In a case where the result of the comparison indicates that the power modes are different, the power mode change program 304 determines that the power mode needs to be changed. In a case where the result of the comparison indicates that the power modes are the same, the power mode change program 304 determines that the power mode need not be changed. In a case where the result of the determination indicates that the power mode needs to be changed (step S1404: Yes), step S1405 is executed. On the other hand, in a case where the result of the determination indicates that the power mode need not be changed (step S1404: No), step S1415 is executed.

The power mode change program 304 determines, in reference to the information obtained in step S1401, whether or not the power mode to which the current power mode is to be changed is power-OFF (step S1405). In a case where the result of the determination indicates that the power mode to which the current power mode is to be changed is power-OFF (step S1405: Yes), step S1406 is executed. On the other hand, in a case where the result of the determination indicates that the power mode to which the current power mode is to be changed is not power-OFF (step S1405: No), step S1409 is executed.

The power mode change program 304 stops the processing request made to the device (step S1406). The power mode change program 304 stands by until the processing request to the device is entirely completed (step S1407). Note that step S1406 and step S1407 are performed to normally end the processing request to the device and prevent the I/O processing of the storage system 102 from being abnormally stopped.

The power mode change program 304 changes the power mode of the device to power-OFF (step S1408). Subsequently, step S1415 is executed.

The power mode change program 304 determines whether or not specific processing is required to change the power mode of the device (step S1409). Note that, the present determination may include pre-retaining, as a table, and referencing per-device information as to whether or not the specific processing is required to change the power mode, or the like.

The power mode change program 304 determines, in reference to the result of step S1409, whether or not the specific pre-processing is required to change the power mode of the device (step S1410). In a case where the result of the determination indicates that the specific pre-processing is required (step S1410: Yes), step S1411 is executed. On the other hand, in a case where the result of the determination indicates that no specific pre-processing is required (step S1410: No), step S1412 is executed.

The power mode change program 304 executes the specific pre-processing involved in the power mode change (step S1411). For example, in a case where the power mode is changed from power-OFF, the power mode change program 304 executes activation processing for the device.

The power mode change program 304 changes the power mode of the device to a determined power mode (step S1412).

The power mode change program 304 determines, in reference to the result of step S1409, whether or not specific post-processing is required after the power mode of the device is changed (step S1413). In a case where the result of the determination indicates that the specific post-processing is required (step S1413: Yes), step S1414 is executed. On the other hand, in a case where the result of the determination indicates that no specific post-processing is required (1413: No), step S1415 is executed.

The power mode change program 304 executes the specific post-processing involved in the power mode change (step S1414). For example, in a case where the power mode is changed from power-OFF, a processing request made to the device is permitted.

The power mode change program 304 references the list of the target devices received in step S1401 and determines whether or not any device next to the current device is present (step S1415). In a case where the result of the determination indicates that the device next to the current device is present (step S1415: Yes), step S1416 is executed. On the other hand, in a case where the result of the determination indicates that no next device is present (step S1415: No), the power mode change processing is ended.

The power mode change program 304 references the list of the target devices received in step S1401 and starts the processing with the device next to the current device (step S1416). Subsequently, step S1404 is executed.

As described above, in the storage system 102, the power mode of each device mounted in at least one controller 104 is changed as appropriate to minimize the power consumption of the device without affecting the I/O performance between the storage system 102 and the host machine 103. Further, in the storage system 102, in a case where an I/O load from the host machine 103 is changed, the power mode of each device changed as described above is further changed without affecting the I/O performance between the storage system 102 and the host machine 103.

As described above, the storage system 102 according to the present embodiment is a storage system including a storage apparatus that saves data in accordance with a data input/output request from a host or outputs the saved data, the storage system including a plurality of components (a plurality of devices) each configured to operate in a normal power mode or at least one power saving mode (including a power-OFF mode) in a switchable manner, the power saving mode consuming less power than the normal power mode, the device operating condition monitoring program 302 as an example of a condition monitoring module that monitors an operating condition of each of the plurality of components, and the power mode control module 305 (power mode determination program 303 and power mode change program 304) that determines a power mode of at least one particular device to be the power saving mode according to a processing load which is related to each of the plurality of devices and which corresponds to a result of monitoring by the condition monitoring module, and that operates the at least one particular device in the power saving mode.

The power consumption suppressing method according to the present embodiment is a power consumption suppressing method for a storage system including a storage apparatus that saves data in accordance with a data input/output request from a host or outputs the saved data, the power consumption suppressing method including a condition monitoring step of monitoring, by the device operating condition monitoring program 302 as an example of a condition monitoring module, an operating condition of each of a plurality of devices as an example of a plurality of components each configured to operate in a normal power mode or at least one power saving mode in a switchable manner, the power saving mode consuming less power than the normal power mode, and a power mode control step of determining, by the power mode control module 305, a power mode of at least one particular device to be the power saving mode according to a processing load which is related to each of the plurality of devices and which corresponds to a result of monitoring by the condition monitoring step, and operating the at least one particular device in the power saving mode, in which the plurality of devices perform mutual control with the storage apparatus in accordance with the data input/output request.

Typically, the storage system includes various devices such as a plurality of CPUs and I/O modules, and each of these devices includes an individual power supply management function. The power supply management function may include a power mode enabling a reduction in power consumption in exchange of a reduction in the processing capability or can perform individual power-OFF. Further, the storage system does not always operate with the maximum load and operates with sufficient margin in such a manner as to be able to provide service without any problem even in a case where a part of a redundant portion fails to degrade the I/O performance that can be provided. Thus, as described above, the storage system 102 monitors the processing load on each device, and for devices with lower processing loads, transitions the devices to an operation mode with less power consumption or powers OFF some of the devices without affecting the I/O performance. The configuration described above suppresses the power consumption of the devices not affecting the I/O performance without degrading the input/output performance between the storage system 102 and the host machine 103, thus enabling a reduction in the power consumption of the storage system 102.

In the present embodiment, the plurality of components are a plurality of devices that control data input/out processing between the storage system and the host, the controller 104 is equipped with the plurality of devices and includes at least one controller 104 that controls the data input/output processing between the storage system and the host by the plurality of devices, and the controller 104 includes the device operating condition monitoring program 302 as an example of a condition monitoring module, and the power mode determination program 303 and the power mode change program 304 included in the power mode control module 305. In this manner, the power consumption of the devices not affecting the I/O performance is suppressed without degrading the input/output performance between the storage system 102 and the host machine 103, thus enabling a reduction in the power consumption of the storage system 102.

In the present embodiment, the above-described power mode control module 305 includes the power mode determination program 303 and the power mode change program 304. The power mode determination program 303 determines the power mode of the particular device to be the power saving mode according to the magnitude of the influence of a change of the power mode of a particular device to the power saving mode on the input/output performance between the storage system 102 and the host machine 103, and the power mode change program 304 switches the power mode of the particular device to the determined power saving mode. In this manner, the power consumption of the storage system 102 can be reduced without degrading the I/O performance between the storage system 102 and the host machine 103.

The storage system 102 according to the present embodiment includes the device management table 401 that manages the information related to the plurality of devices, and the device operation history table 402 that manages the operating conditions of the plurality of devices monitored by the device operating condition monitoring program 302, and the power mode determination program 303 determines, for the plurality of devices managed in the device management table 401, the power mode of a particular device to be the power saving mode in a case of determining that the influence of a change of the power mode of the particular device to the power saving mode on the data input/output processing (for example, the I/O performance between the storage system 102 and the host machine 103) is lower than or equal to a predetermined criterion, in reference to the operating conditions of the plurality of devices managed in the device operation history table 402. In this manner, the power consumption of the storage system 102 can be reduced without degrading the I/O performance between the storage system 102 and the host machine 103.

In the present embodiment, the device management table 401 manages, for each group of the plurality of devices, the power consumption and the processing capability for each of the normal power mode and the power saving mode, and in reference to the power consumption and the processing capability for each of the normal power mode and the power saving mode for each group of the plurality of devices managed in the device management table, the power mode control module 305 determines the power saving mode for the power mode of a particular device, and changes the power mode of the particular device to the power saving mode. In this manner, the power consumption of the storage system 102 can be reduced without degrading the I/O performance between the storage system 102 and the host machine 103.

In the present embodiment, the device management table 401 manages the power control unit 502 that defines the first category in which the power modes of the plurality of devices are controlled independently of the power modes of the other devices and the second category in which the power modes of the plurality of devices are controlled in combination with the power modes of the other devices (see FIG. 5). In this manner, the power mode determination program 303 finely changes the power mode for at least each device in consideration of the power control unit 502 in the device management table 401. Accordingly, the power consumption of the storage system 102 can further be reduced without degrading the I/O performance between the storage system 102 and the host machine 103.

In the present embodiment, the device management table 401 manages, as the power control unit 502, for example, the device unit including devices considered to be independent of the other devices in terms of control of power consumption, the connection destination device unit (for example, the memory 107 group) including devices for which the power mode is to be changed in line with the other devices, and the controller unit including the controller group (for example, the accelerator 110 group) in which each group of the plurality of controllers 104 is to provide similar performance. In this manner, the power modes of the devices are collectively changed in more preferable units, and thus the power consumption of the storage system 102 can further be reduced without degrading the I/O performance between the storage system 102 and the host machine 103.

In the present embodiment, the power mode control module 305 classifies a plurality of device into devices that are subjected to grouping and that have a low level of independence from one another in terms of control of power consumption of the plurality of devices and devices that are not subjected to grouping and that have a high level of independence from one another in terms of control of power consumption of the plurality of devices, and switches the power mode to the power saving mode for the devices that are subjected to the grouping and for the devices that are not subjected to the grouping, according to the result of monitoring by the device operating condition monitoring program 302. In this manner, the power mode of each device is changed, with independence from the other devices considered. Accordingly, the power consumption of the storage system 102 can further be reduced without degrading the I/O performance between the storage system 102 and the host machine 103.

In the present embodiment, in a case where a plurality of devices that can be grouped are present, the power mode control module 305 classifies the plurality of devices that can be grouped into a first device group (for example, the memory 107) in which a plurality of devices that are grouped are to have the same change form of the power mode and a second device group in which a plurality of devices that are grouped need not have the same change form of the power mode, and for the first device group, changes the power mode to the same changed power mode. In this manner, the first device group in which a plurality of devices that are grouped are to have the same change form of the power mode is controlled in such a manner that the plurality of devices that can be grouped are to have the same changed power mode. Accordingly, the power consumption of the storage system 102 can be reduced without degrading the I/O performance between the storage system 102 and the host machine 103.

In the present embodiment, the power mode control module 305 classifies the devices into devices tolerating power-OFF as a power saving mode, and devices not tolerating power-OFF as a power saving mode (for example, the host I/F connected to the host machine 103) (the classification is determined, for example, in S1008 in FIG. 10). For the devices tolerating power-OFF as a power saving mode, the power mode is switched to power-OFF according to the result of monitoring by the device operating condition monitoring program 302, whereas, for the devices not tolerating power-OFF as a power saving mode, the power mode is switched to the power saving mode (not including power-OFF) according to the result of monitoring by the device operating condition monitoring program 302. In this manner, when the devices are appropriately classified, devices tolerating complete stoppage of power supply consume no power. Accordingly, the power consumption of the storage system 102 can further be reduced without degrading the I/O performance between the storage system 102 and the host machine 103.

In the present embodiment, the power mode determination program 303 determines the power mode for a combination of particular devices having a dependence relation as connection destination devices, in consideration of the combination of the particular devices. In this manner, the combination of the power modes of a plurality of devices having a dependence relation is determined, and the dependence relation of the combination of particular devices is prevented from being strained. The power consumption of the storage system 102 can thus be reduced without degrading the I/O performance between the storage system 102 and the host machine 103.

In the present embodiment, in a case where a plurality of particular devices tolerate the predicted value of the future processing load value being zero and the power supply being turned OFF, the power mode determination program 303 determines the power mode to be power-OFF for the plurality of particular devices when the plurality of particular devices need to be unified in terms of the power mode. In this manner, the power consumption of the storage system 102 can be reduced without degrading the I/O performance between the storage system 102 and the host machine 103.

(2) Second Embodiment

In a second embodiment, configurations and operations similar to those in the first embodiment are omitted from description, and differences from the first embodiment will mainly be focused on below.

Figure 15:
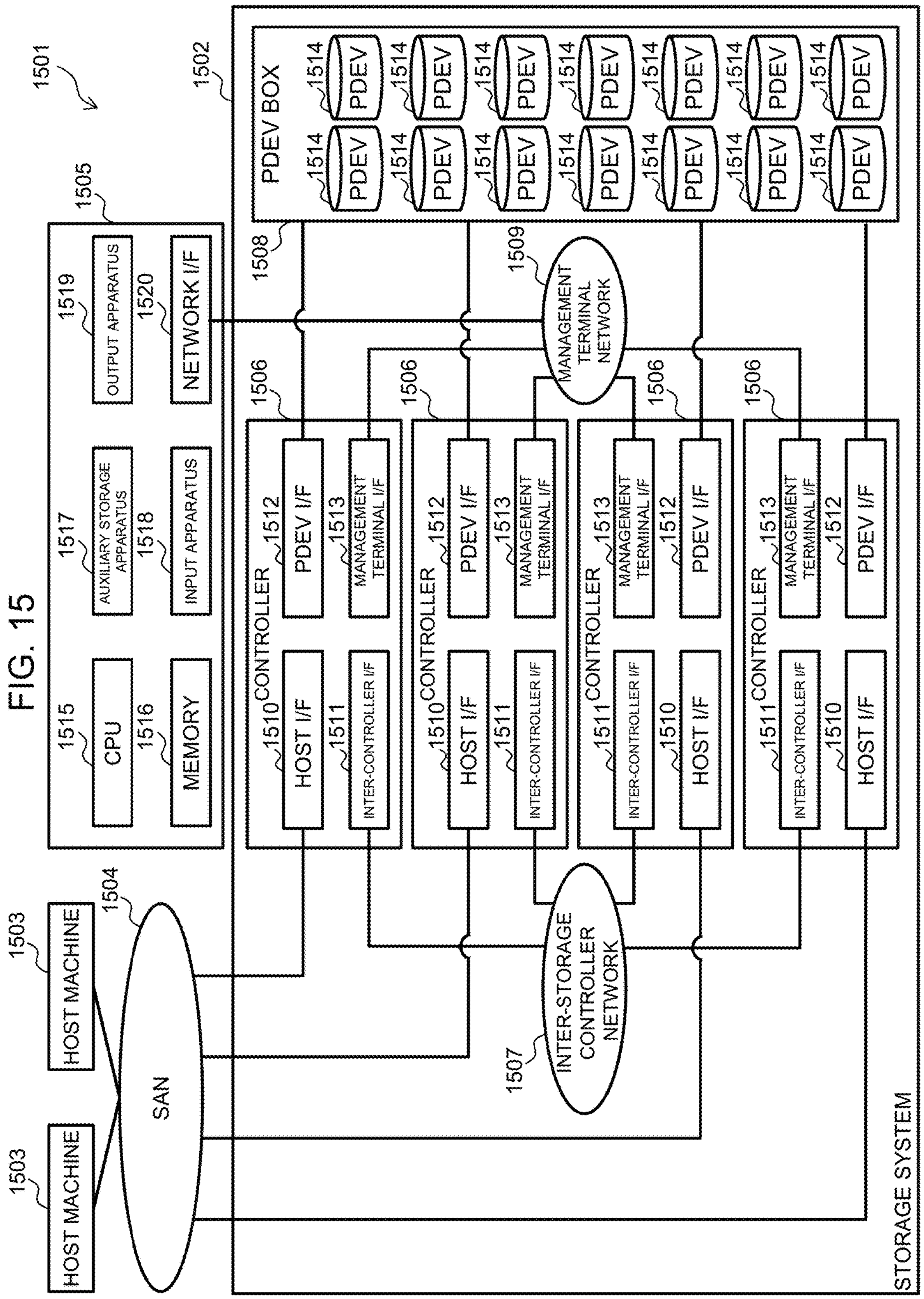
FIG. 15 is a system configuration diagram illustrating a configuration example of an information system according to a second embodiment.

FIG. 15 is a system configuration diagram illustrating a configuration example of an information system 1501 according to the second embodiment. In the first embodiment, the power mode is mainly controlled in the units of a plurality of components constituting the storage system, for example, devices such as various pieces of electronic equipment or parts, according to the processing load. However, in the second embodiment, the power mode is controlled in the units of a plurality of components mounted in the storage system 102, for example, controllers 1506, according to the processing load.

An information system 1501 includes one or more storage systems 1502, one or more host machines 1503, and one or more storage area networks (SAN) 1504. One or more management terminals 1505 are configured, for example, as a part of the storage system 1502.

The storage system 1502 includes one or more controllers 1506, one or more inter-storage-controller networks 1507, one or more PDEV BOXes 1508, and one or more management terminal networks 1509.

The PDEV BOX 1508 includes one or more PDEVs 1514. Note that, although not illustrated, the PDEV BOX 1508 may have the same configuration as that of the PDEV BOX 105. In FIG. 15, the controller 1506 and the PDEV BOX 1508 are directly connected. However, the controller 1506 and the PDEV BOX 1508 may be connected via a network not illustrated.

The controller 1506 includes a host I/F 1510, an inter-controller I/F 1511, a PDEV I/F 1512, and a management terminal I/F 1513. Note that, although not illustrated, the controller 1506 may have, for example, the same configuration as that of the controller 104 in FIG. 1 in the first embodiment and may include a CPU, a memory, an accelerator, and a network switch.

The host I/F 1510 is connected to the host machine 1503 via the SAN 1504, and meets I/O requests and performs transmission and reception of I/O data. The inter-controller I/F 1511 is connected to the inter-controller I/F 1511 of another controller 1506 via the inter-storage-controller network 1507, and performs processing requests and responses and data transmission and reception between the controllers 1506.

The PDEV I/F 1512 transmits and receives data to and from the PDEV 1514 of the PDEV BOX 1508 and executes other processing. The management terminal I/F 1513 is connected to the management terminal 1505 via the management terminal network 1509, and receives processing requests from the management terminal 1505 and responds with processing results.

The management terminal 1505 includes a CPU 1515, a memory 1516, an auxiliary storage apparatus 1517, an input apparatus 1518, an output apparatus 1519, and a network I/F 1520.

The CPU 1515 controls the whole management terminal 1505, and operates according to a microprogram stored in the memory 1516. The auxiliary storage apparatus 1517 is controlled by the CPU 1515, and is made involatile by writing/reading of programs and management information stored in the memory 1516.

The input apparatus 1518 is controlled by the CPU 1515 and used when a storage manager operates the management terminal 1505. The output apparatus 1519 is controlled by the CPU 1515 and used when the storage manager references information included in the management terminal 1505. The network I/F 1520 is controlled by the CPU 1515, and requests processing to the controller 1506 provided in the storage system 1502 and receives processing results.

In the present embodiment, the management terminal 1505 is configured independently of the storage system 1502. However, the management terminal 1505 may be built into the storage system 1502. Further, the components connected together via a network such as the SAN 1504, the inter-storage-controller network 1507, or the management terminal network 1509, may be directly coupled together. The components not connected together via a network may be connected together via a network.

Figure 16:
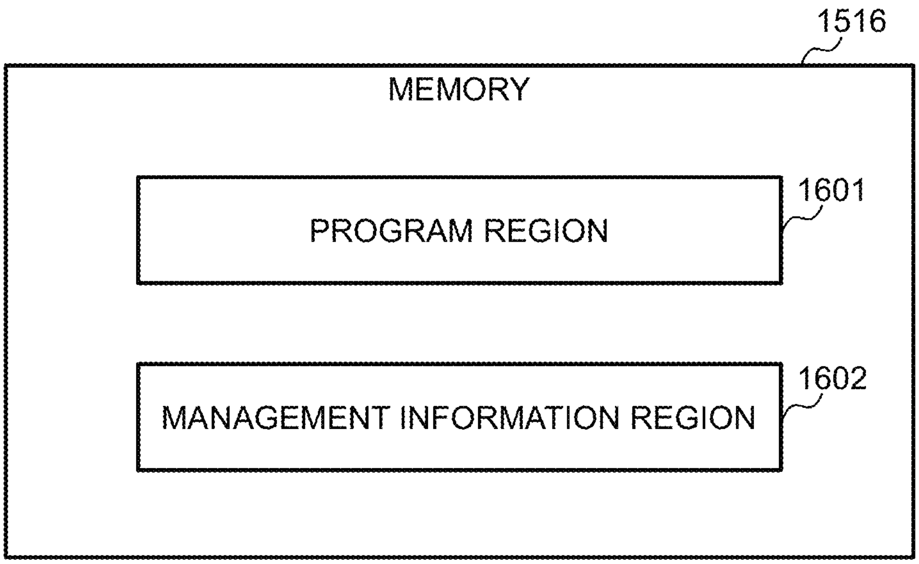
FIG. 16 is a diagram illustrating a configuration example of a memory of a management terminal depicted in FIG. 15.

FIG. 16 is a diagram illustrating a configuration example of the memory 1516 of the management terminal 1505 depicted in FIG. 15. The memory 1516 includes a program region 1601 and a management information region 1602 that are reserved.

The program region 1601 is a region in which programs used by the CPU 1515 to execute processing are stored. The management information region 1602 is a region accessed by the CPU 1515 and in which various management tables are stored. The program region 1601 and the management information region 1602 will be described below in detail.

Figure 17:
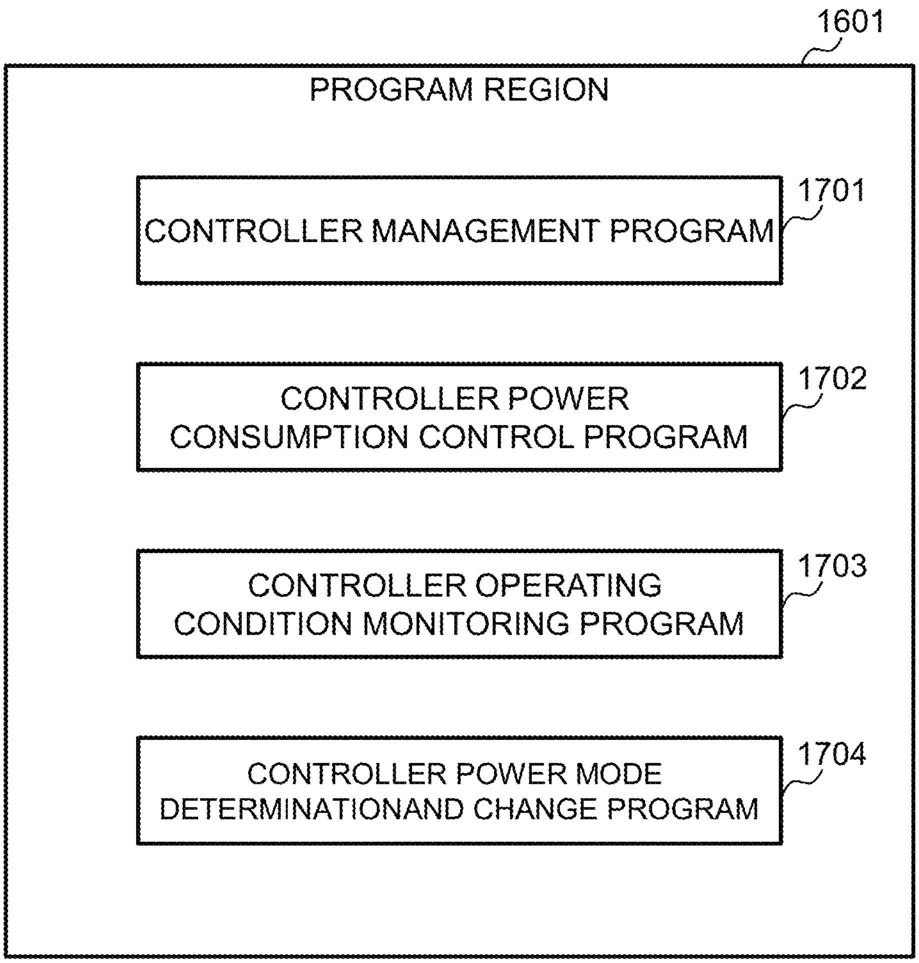
FIG. 17 is a diagram illustrating examples of programs stored in a program region depicted in FIG. 16.

FIG. 17 is a diagram illustrating an example of programs stored in the program region 1601 depicted in FIG. 16. FIG. 17 corresponds to FIG. 3 in the first embodiment except for the target for which the power mode is controlled. The program region 1601 stores, for example, a controller management program 1701, a controller power consumption control program 1702, a controller operating condition monitoring program 1703, and a controller power mode determination and change program 1704.

The management terminal 1505 executes the controller management program 1701 to perform input/output control and the like and allow the storage manager to manage the controller 1506.

Further, the management terminal 1505 executes the controller power consumption control program 1702 to enable a reduction in power consumption without reducing the I/O performance of the storage system 1502. The controller power consumption control program 1702 includes functions similar to those of the power consumption control program 301 in the first embodiment except that the target for which the power mode is controlled is the controller 1506 instead of the device.

Further, during the process of the processing, the controller power consumption control program 1702 invokes the controller operating condition monitoring program 1703 that monitors the processing load on the controller 1506 and stores history information and the power mode determination and change program 1704 that controls the power mode of each controller 1506 in reference to the history information described above and the like.

Here, the storage system according to the present embodiment is a storage system including a storage apparatus that saves data in accordance with a data input/output request from a host or outputs the saved data, the storage system including a plurality of components (a plurality of controllers 1506) as an example of a plurality of components each configured to operate in a normal power mode or at least one power saving mode in a switchable manner, the power saving mode consuming less power than the normal power mode. The storage system according to the present embodiment includes the controller operating condition monitoring program 1703 as an example of a condition monitoring module that monitors an operating condition of each of the plurality of components, and the controller power mode determination and change program 1704 as an example of the power mode control module that determines a power mode of a particular component to be the power saving mode according to a processing load which is related to each of the plurality of devices and which corresponds to a result of monitoring by the controller operating condition monitoring program 1703 and that operates the particular component in the power saving mode.

In the present embodiment, the plurality of components described above are the plurality of controllers 1506 that control the input/output processing between the storage system and the host, the storage system according to the present embodiment includes the management terminal 1505 that control the plurality of controllers 1506, and the management terminal 1505 includes the controller operating condition monitoring program 1703 as an example of the condition monitoring module, and the controller power mode determination and change program 1704 as an example of the power mode control module.

The controller operating condition monitoring program 1703 includes functions similar to those of the device operating condition monitoring program 302 in the first embodiment except that the target for which the power mode is controlled is the controller 1506 instead of the device.

The controller power mode determination and change program 1704 includes functions similar to those of the power mode control module 305 (power mode determination program 303 and the power mode change program 304) in the first embodiment except that the target for which the power mode is controlled is the controller 1506 instead of the device.

In the present embodiment, the controller power mode determination and change program 1704 selects, according to a redundancy setting (for example, tolerance for controller faults (N-multiplex)), a particular power mode that may transition, in response to detection of a fault occurring in any of the plurality of controllers, to a state in which the other controllers can execute the input/output processing immediately after the detection. In this manner, even when a fault occurs in any of the controllers, the input/output processing can immediately be executed.

Further, in the present embodiment, the controller power mode determination and change program 1704 enables the other controllers to transition to the state in which the input/output processing can be executed immediately after the detection, while operating some of CPU cores equipped with a plurality of cores, with the other cores kept standing by. In this manner, the CPU is operated with the minimum number of cores, enabling a further reduction in power consumption.

Figure 18:
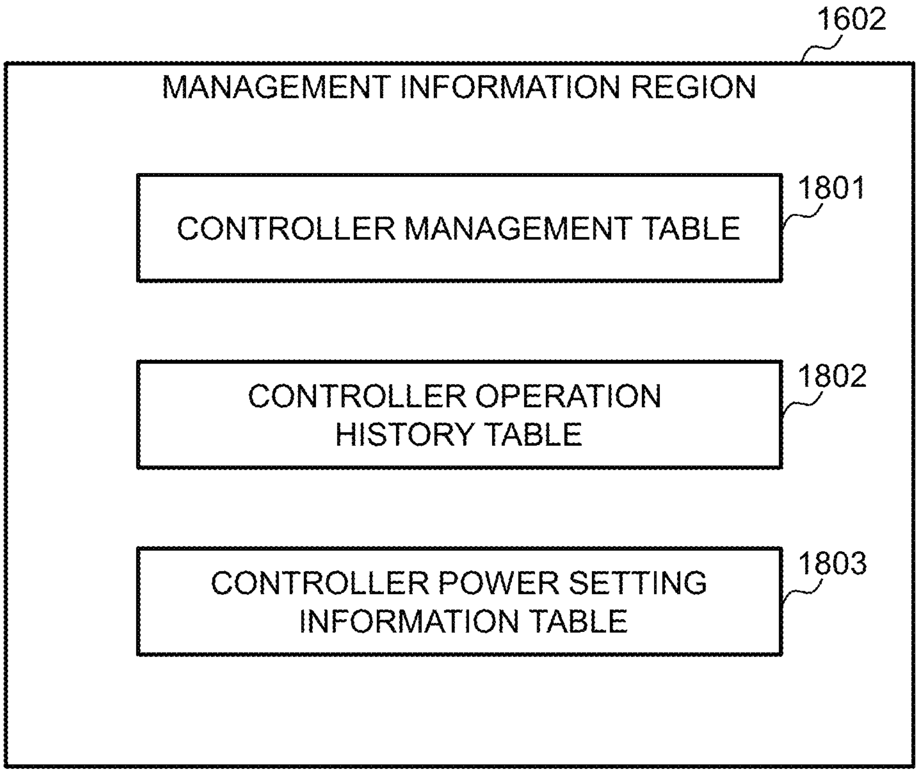
FIG. 18 is a diagram illustrating an example of information stored in a management information region depicted in FIG. 16.

FIG. 18 is a diagram illustrating an example of information stored in the management information region 1602 depicted in FIG. 16. The management information region 1602 stores a controller management table 1801, a controller operation history table 1802, and a controller power setting information table 1803.

The controller management table 1801 includes information related to the controller 1506 constituting the storage system 1502, and is used for processing of determining the power mode. The controller management table 1801 will be described below in detail.

The controller operation history table 1802 includes history information regarding processing loads from past to present in the controller 1506 constituting the storage system 1502, and is used for processing of determining the power mode. The controller operation history table 1802 will be described below in detail.

The controller power setting information table 1803 includes information set to control the power consumption of the storage system 1502 by the administrator of the storage system. The controller power setting information table 1803 will be described below in detail.

FIG. 19 is a diagram illustrating a configuration example of the controller management table 1801 depicted in FIG. 18. The controller management table 1801 includes entries of a controller identifier 1901, a normal mode 1902 (first power mode), power-OFF 1903, a standby mode 1904 (third power mode), power saving mode A 1905 (one second power mode), and a power saving mode B 1906 (one second power mode).

The controller identifier 1901 is an identifier for the controller 1506 mounted in the storage system 1502. For example, for the controllers 1506 in FIG. 15, identifiers ABC 1, ABC 2, ABC 3, and ABC 4 are assigned to the controllers 1506 in this order from top to bottom.

The normal mode 1902, the power-OFF 1903, the standby mode 1904, the power saving mode A 1905, and the power saving mode B 1906 corresponding to each controller identifier 1901 indicate the power mode of the controller 1506 mounted in the storage system 1502, and each include power consumption and processing capability (relative value when the value in the normal mode is 100%).

Note that the present embodiment includes five power modes but may include at least two power modes. Further, the number of corresponding power modes may vary among the controllers 1506, or not all of the controllers 1506 need to include a plurality of power modes. Now, a case where some controllers 1506 do not include a plurality of power modes will be described. This means a case where, in the storage system 1502 including a plurality of controllers 1506, some controllers 1506 include a variable power mode, some of the other controllers 1506 are set to be unable to have a variable power mode or some of the other controllers 1506 include no function to vary the power mode. Further, the present embodiment mainly refers to two items of power consumption and processing capability but may refer to, as other items, other information required to select the power mode, for example, a restriction imposed when the power mode is used (function is restricted) and the like.

Now, differences between the power-OFF 1903 and the standby mode 1904 will be described. Both modes have a processing capability of 0% and have in common that the input/output processing cannot be executed under the current situation. The power-OFF 1903 is a mode in which the controller 1506 is stopped and which consumes no power but requires time to make the I/O processing executable (to activate the I/O processing). In contrast, the standby mode 1904 is a mode that consumes a small amount of power but requires a very short time to make the I/O processing executable. The standby mode 1904 focuses on the multicore configuration of the CPU, which is commonly used in the controller 1506, and uses the advantages of the multicore configuration. For example, the standby mode 1904 is implemented to activate only one core of the CPU mounted in the controller 1506, while keeping the remaining cores non-operational, and to allow non-operational cores of the CPU or devices required for I/O to be immediately activated when the need arises to transition to the state in which the I/O processing can be executed. In general, the storage system used for business applications needs to continue the I/O processing even in a case where at least one storage controller fails and is shut down. This is because, in a certain case, even when the processing load on the storage system 1502 is low and shutting down some of the storage controllers does not affect the processing capability, the storage system 1502 needs to be able to immediately execute the I/O processing on the assumption that any of the storage controllers may fail and because, in such a case, the use of the standby mode 1904 is very useful in making both power saving and the continuity (availability) of the I/O processing compatible.

FIG. 20 is a diagram illustrating a configuration example of the controller operation history table 1802 depicted in FIG. 18. The controller operation history table 1802 includes entries of a sampling time 2001, a controller identifier 2002, status 2003, a power mode 2004, and a processing load 2005.

The sampling time 2001 indicates the time when the history of the storage controller was sampled. The sampling time 2001 may be, for example, the time elapsed since the activation of the storage system. The controller identifier 2002 is an identifier for the controller 1506, and indicates a correspondence relation with the controller identifier 1901 in the controller management table 1801.

The status 2003 indicates the operating condition of the controller 1506. The status 2003 has such information as "normal," "abnormal (activation disabled, I/O processing disabled)," and the like. The power mode 2004 indicates the power mode of the storage controller. The power mode 2004 is any one of the normal mode 1902, the power-OFF 1903, the standby mode 1904, the power saving mode A1905, and the power saving mode B1906 in the controller management table 1801. The processing load 2005 indicates the processing load on the controller 1506.

FIG. 21A to FIG. 21C are diagrams illustrating a setting example of the controller power setting information table 1803 depicted FIG. 18. Note that FIG. 21A to FIG. 21C comprehensively indicate power setting information regarding the controllers 1506 included in the storage system 1502 and that the power setting information is managed separately from the power modes set for the individual controllers 1506.

The controller power setting information table 1803 includes entries of a power saving mode setting 2101, a redundancy set value 2102, and a power consumption upper limit value 2103. Here, in reference to three setting examples, an example of stored information is illustrated and will be described below.

The setting example in FIG. 21A indicates a case where the method of reducing power consumption in the present embodiment is not used (case where the normal mode is always used as the power mode of the controller 1506 as in the known art). In this case, the redundancy set value 2102 and the power consumption upper limit value 2103 have no information.

The setting example in FIG. 21B indicates the case of the application, to the storage system 1502, of the method of reducing power consumption according to the processing load without degrading the I/O processing performance in the present embodiment. In this case, the redundancy set value 2102 indicates information as to whether the controller 1506 is operated at any level of multiplexity (redundancy) in such a manner that the controller 1506 can continue the I/O processing in a case where the controller 1506 fails. In the present embodiment, the redundancy is defined as “n-multiplex (n: natural number),” and redundancy 1 refers to 2-multiplex (that is, duplex) and means that two or more controllers 1506 can process any I/O, indicating that the I/O processing can be continued even in a case where one storage controller fails. In other words, N-multiplex (in other words, given N−1 redundancy) means that N or more controllers 1506 can process any I/O, indicating that the I/O processing can be continued even in a case where N−1 storage controllers fail. Note that, in such a situation where the storage controller fails, when any of the normally operating storage controllers detects that the current redundancy of the storage system 1502 is below a specified redundancy, in response to the detection, the normally operating storage controller sets up the storage controllers for which the power-OFF or the standby mode is set, recovering the redundancy. Note that, in the recovery processing, for example, in a case where both the storage controller with power-OFF and the storage controller in the standby mode are present, the storage controller in the standby mode is made active, and the storage controller with power-OFF is transitioned to the standby mode. This enables recovery processing with a quick redundancy, and preparation of a stock of storage controllers in the standby mode which can be set up at high speed in response to further occurrence of a failure in the storage controller.

The setting example in FIG. 21C indicates a case where, with the upper limit value of power consumption set, the storage system 1502 is operated in such as manner as to avoid exceeding any power consumption in spite of an increased processing load. In this case, the upper limit value of power consumption set by the user is stored in the power consumption upper limit value 2103.

Figure 22:
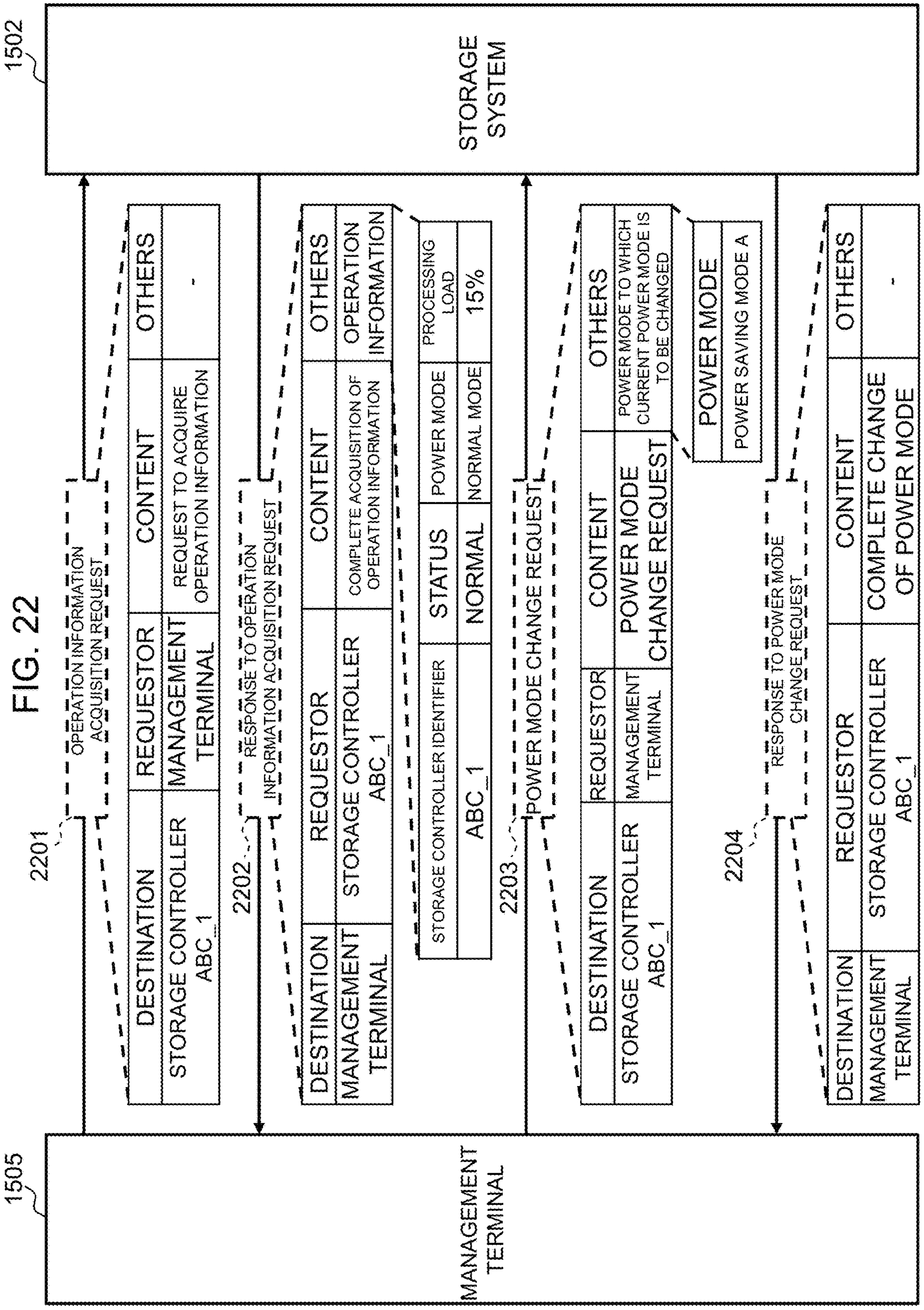
FIG. 22 is a diagram illustrating an example of data transmitted in a processing request and a response between a storage system and a management terminal depicted in FIG. 15.

FIG. 22 is a diagram illustrating an example of data exchanged in processing requests and responses between the storage system 1502 and the management terminal 1505 depicted in FIG. 15.

An operation information acquisition request 2201 is transmitted to the storage system 1502 when the management terminal 1505 desires to acquire operation information regarding each controller 1506. The operation information acquisition request 2201 includes an identifier for a destination controller, a requestor, and the content of a request.

A response 2202 to the operation information acquisition request 2201 is transmitted, in the storage system 1502, from the controller 1506 having acquired the operation information to the management terminal 1505. The response 2202 to the operation information acquisition request 2201 includes a destination, an identifier for a requesting controller 1506, the content of a request, and acquired operation information. Note that the operation information corresponds to one entry in the controller operation history table 1802.

A power mode change request 2203 is transmitted to the storage system 1502 when the management terminal 1505 desires to change the power mode of the controller 1506. The power mode change request 2203 includes an identifier for a destination controller 1506, a requestor, the content of a request, and information regarding a power mode to which current power mode is to be changed.

A response 2204 to the power mode change request 2203 is transmitted, in the storage system 1502, from the controller 1506 having completed a change in power mode to the management terminal 1505. The response 2204 to the power mode change request 2203 includes a destination, an identifier for a requesting controller 1506, and the result (content) of processing.

Figure 23:
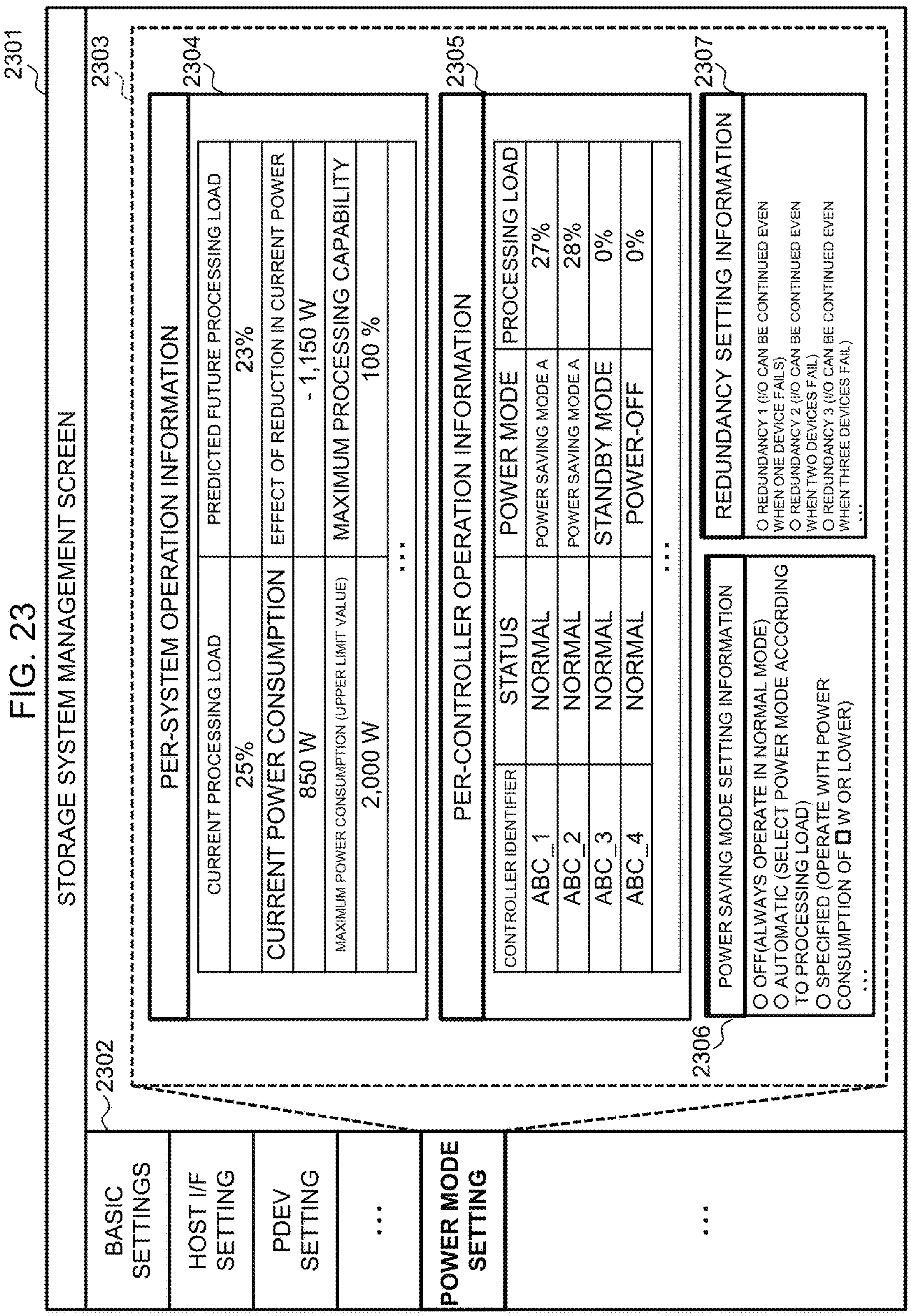
FIG. 23 is a diagram illustrating an example of a storage system management screen.

FIG. 23 is a diagram illustrating an example of a storage system management screen 2301. The storage system management screen 2301 is displayed at the management terminal 1505.

The storage system management screen 2301 includes a menu bar 2302 and a screen 2303 corresponding to each menu. FIG. 23 depicts a state in which a menu of power mode setting has been selected.

The screen 2303 includes per-system operation information 2304, per-controller operation information 2305, power saving mode setting information 2306 related to the storage system 1502, and redundancy setting information 2307 related to the storage system 1502.

The per-system operation information 2304 displays information related to the storage system 1502 managed by the management terminal 1505. For example, the per-system operation information 2304 includes sampled information regarding the controller 1506 such as a current processing load value, a future processing load predicted value, a current power consumption value, current power reduction effect (according to the present embodiment), maximum power consumption (upper limit value), and maximum processing capability, and other user-set information.

The per-controller operation information 2305 displays current information related to each of the controllers 1506 included in the storage system 1502. The per-controller operation information 2305 indicates, for example, a controller identifier, status, a power mode, and a processing load.

The power saving mode setting information 2306 is an interface accepting a user input used to select the power saving mode related to the storage system 1502, and also functions as a display interface for referencing of the current setting information.

The redundancy setting information 2307 is an interface accepting a user input used to select a redundancy (which multiplex is used to operate the storage system) related to the storage system 1502, and also functions as a display interface for referencing of the current setting information. Further, the controller power setting information table 1803 depicted in FIG. 21A to FIG. 21C also reflects information such as the maximum power consumption (upper limit value) included in the power saving mode setting information 2306, the redundancy setting information 2307, and the operation information 2304, and the information is used to set the power mode for each controller 1506. Note that the screen configuration illustrated here is an example and may be implemented in a form other than the present form. For example, an interactive command line interface may be used.

Figure 24:
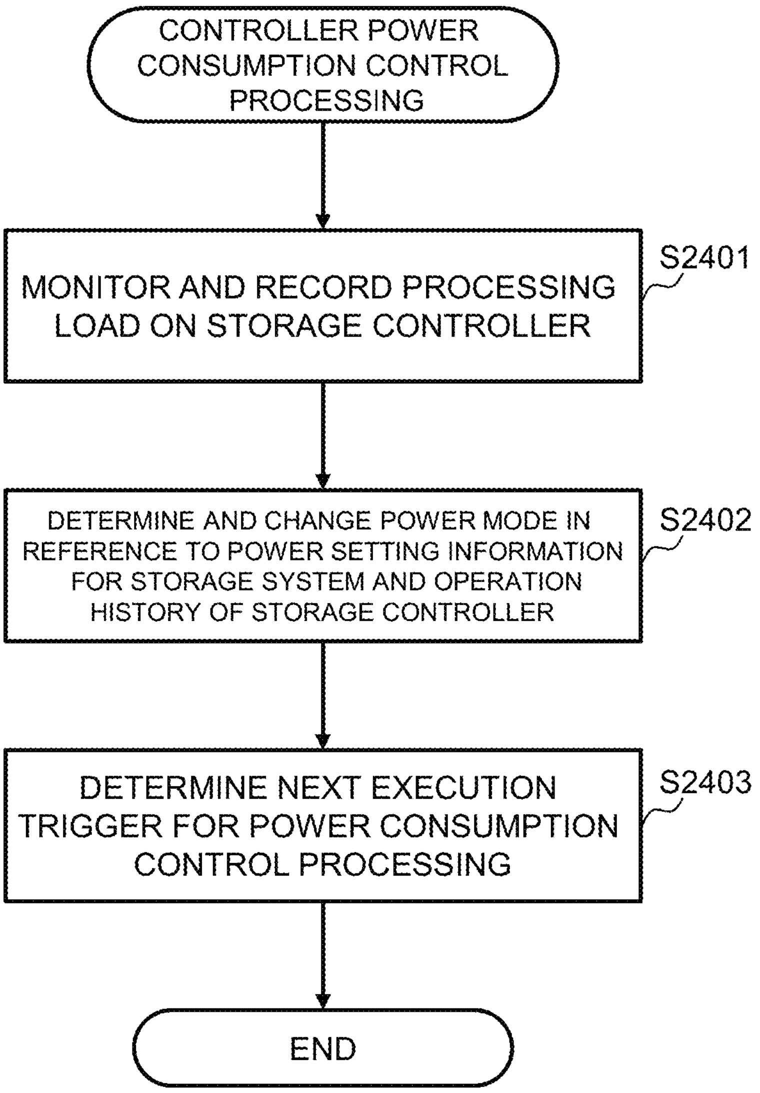
FIG. 24 is a flowchart illustrating an example of a procedure of controller power consumption control processing.

FIG. 24 is a flowchart illustrating an example of a procedure of controller power consumption control processing. The controller power consumption control processing is processing for reducing the power consumption in the management terminal 1505.

The controller power consumption control processing is executed by the CPU 1515 when the management terminal 1505 is activated, and is an example in which reduction control for power consumption is automatically performed (for example, assumed is a case in which, in FIG. 23, "AUTOMATIC" is selected as power saving mode setting information)

Note that FIG. 22 described above illustrates the outline of a process of monitoring the processing load on each controller 1506 and the like, and a request/response process for the power mode set for each controller 1506, which is determined in reference to the monitoring result, the set redundancy, and the specified maximum power consumption.

In FIG. 24, in the automatic execution of the controller power consumption control processing described above, for example, the following three steps are executed. Note that the execution of these steps is implemented by the CPU 1515 reading the controller management program 1701 stored in the program region 1601 of the memory 1516, in response to setup of the management terminal 1505 or update of the power saving mode setting information 2306, and by, in response to the execution of the controller management program 1701, the controller power consumption control program 1702, the controller operating condition monitoring program 1703, or the controller power mode determination and change program 1704 being run.

In a first step, when the management terminal 1505 is set up, the CPU 1515 monitors the processing load on the controller 1506 mounted in the management terminal 1505, and records the processing load in the controller operation history table 1802 (step S2401). More specifically, for example, in a case where automatic is specified as a power saving mode setting, the power mode is optimized periodically or in accordance with an instruction from the user. First, the controller management program 1701 is executed, and as a step included in the processing, the CPU 1515 reads and executes the controller operating condition monitoring program 1703 to perform monitoring of the processing load on the controller 1506.

The controller operating condition monitoring program 1703 accesses the controller management table 1801 to acquire the information concerning the controller identifier 1901. The controller operating condition monitoring program 1703 specifies, in reference to the controller identifier 1901, the counterpart (destination) that is to be required to check the status of the processing load, and collectively transmits, to the storage system 1502, as an operation information acquisition request 2201, the requestor specified as the CPU 1515 itself (that is, the management terminal 1505), the content of the request (request to acquire operation information), and the like. Further, in parallel with the processing, the CPU 1515 records the sampling time 2001, and the recording is performed, for example, in step S2502 depicted in FIG. 25 described below.

When any of the controllers 1506 in the storage system 1502 receives the operation information acquisition request 2201 described above, according to the controller identifier 1901 included in the operation information acquisition request 2201, the controller 1506 transfers the operation information acquisition request 2201 to the controller 1506 to which the corresponding controller identifier 1901 is assigned.

Upon receiving the transferred operation information acquisition request 2201, the controller 1506 acquires the operation information of the controller 1506 itself in accordance with the request to acquire operation information, included in the operation information acquisition request 2201. Subsequently, the controller 1506 transmits the response 2202 to the operation information acquisition request 2201, together with the acquired operation information, a completion notification for the acquisition of operation information in response to the operation information acquisition request 2201, source information (that is, the controller identifier 1901 assigned to the controller 1506 as the requestor), and destination information (management terminal 1505). Note that the operation information includes, for example, information such as the controller identifier 1901, status, a power mode being applied, and a processing load. Note that the processing load is expressed, by way of example, as a percentage determined by dividing the I/O processing capability per any unit time by the specified maximum processing capability but the definition of the processing load is not limited to this.

Upon receiving the response 2202 to the operation information acquisition request 2201, the management terminal 1505 writes the operation information into the controller operation history table 1802 stored in the memory 1516, as depicted in FIG. 20. Step S2401 will be described in detail with reference to FIG. 25.

Subsequently, in a second step, the controller power mode determination and change program 1704 references the controller management table 1801, the controller operation history table 1802, and the controller power setting information table 1803 to determine the power mode of each controller 1506 in reference to the operation information and the setting information, and changes the power mode as necessary (step S2402). Note that, while the contents of processing in step S2401 and step S2402 in the case of automation will be described below, for example, processing as described below is executed.

First, the controller management program 1701 reads and executes the controller power consumption control program 1702. The controller power consumption control program 1702 accesses the management information region 1602 to acquire related information and determine the power mode to be applied to each controller 1506. The determined power mode is transmitted from the management terminal 1505 to the storage system 1502.

For example, as depicted in FIG. 22 described above, the management terminal 1505 issues, to the storage system 1502, the destination information (controller identifier 1901), the requestor (that is, the management terminal 1505), and the power mode change request 2203 including the content of the instruction (that is, the power mode change request) and the specified power mode (including a power mode required to be applied). The issued power mode change request 2203 is received by any of the controllers 1506 and transferred to the corresponding controller 1506 according to the controller identifier 1901. For example, upon receiving the power mode change request 2203 addressed to the controller 1506, the controller 1506 executes required processing. The required processing includes step S1407 (standby for the processing request) and step S1411 (specific pre-processing) in FIG. 14 in the first embodiment.

Upon receiving the issued power mode change request 2203, the controller 1506 performs response to the management terminal 1505 (response 2204 to the power mode change request 2203).

In a third step, the CPU 1515 determines the next trigger to execute the power consumption control processing, and ends the processing (step S2403). Note that the next trigger for execution may be, for example, elapse of a certain period of time or one or more conditions set such as the timing when the storage manager operates the management terminal 1505 and the timing when the storage controller is mounted or removed. At any rate, information related to the determined trigger may be stored in a designated region (not illustrated) of the management information region 1602 as a variable related to activation of the controller management program 1701.

Figure 25:
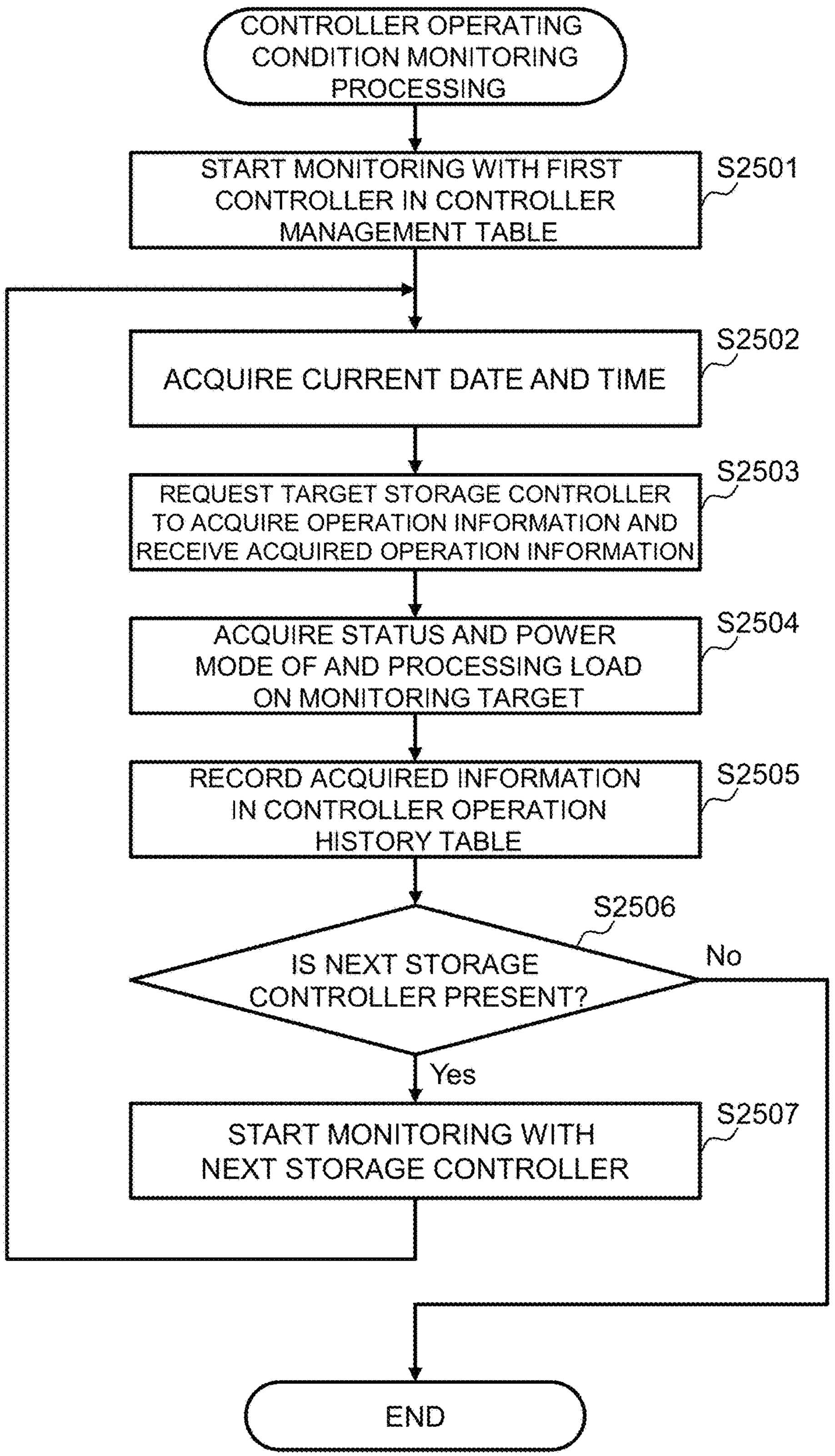
FIG. 25 is a flowchart illustrating an example of a procedure of controller operating condition monitoring processing.

FIG. 25 is a flowchart illustrating an example of a procedure of controller operating condition monitoring processing. The controller operating condition monitoring processing is executed in storage system power consumption control processing performed in the management terminal 1505.

The CPU 1515 references the controller management table 1801 and starts monitoring with the controller listed in the first row (step S2501). Note that here, monitoring is started with the controller listed in the first row but the order is not limited to this.

The CPU 1515 acquires the current date and time (step S2502). Note that the date and time acquired here is information corresponding to the sampling time 2001 in the controller operation history table 1802, and may be a point of time or the time elapsed since the activation of the storage system 102, for example.

The CPU 1515 issues a processing request to the target controller 1506 to acquire operation information (status, power mode, and processing load), makes the processing stand by until the result is received, and proceeds to the next processing upon receiving the result (step S2503).

The CPU 1515 acquires the operation information regarding the target controller 1506 (step S2504), and records the acquired information (current date and time, status, power mode, and processing load) in a storage system management history table (not illustrated) (step S2505).

The CPU 1515 references the controller management table 1801 to determine whether or not any storage controller next to the currently targeted storage controller is present (step S2506). In a case where the result of the determination indicates that the next storage controller is present (step S2506: Yes), the procedure proceeds to step S2507. On the other hand, in a case where the result of the determination indicates that no next storage controller is present (step S2506: No), the processing is ended.

The CPU 1515 references the controller management table 1801 to activate the controller operating condition monitoring program 1703 with use of, as a target, the storage controller next to the currently targeted storage controller, and starts monitoring for the load on each controller 1506 (step S2507). Subsequently, the procedure proceeds to step S2502.

Figure 26:
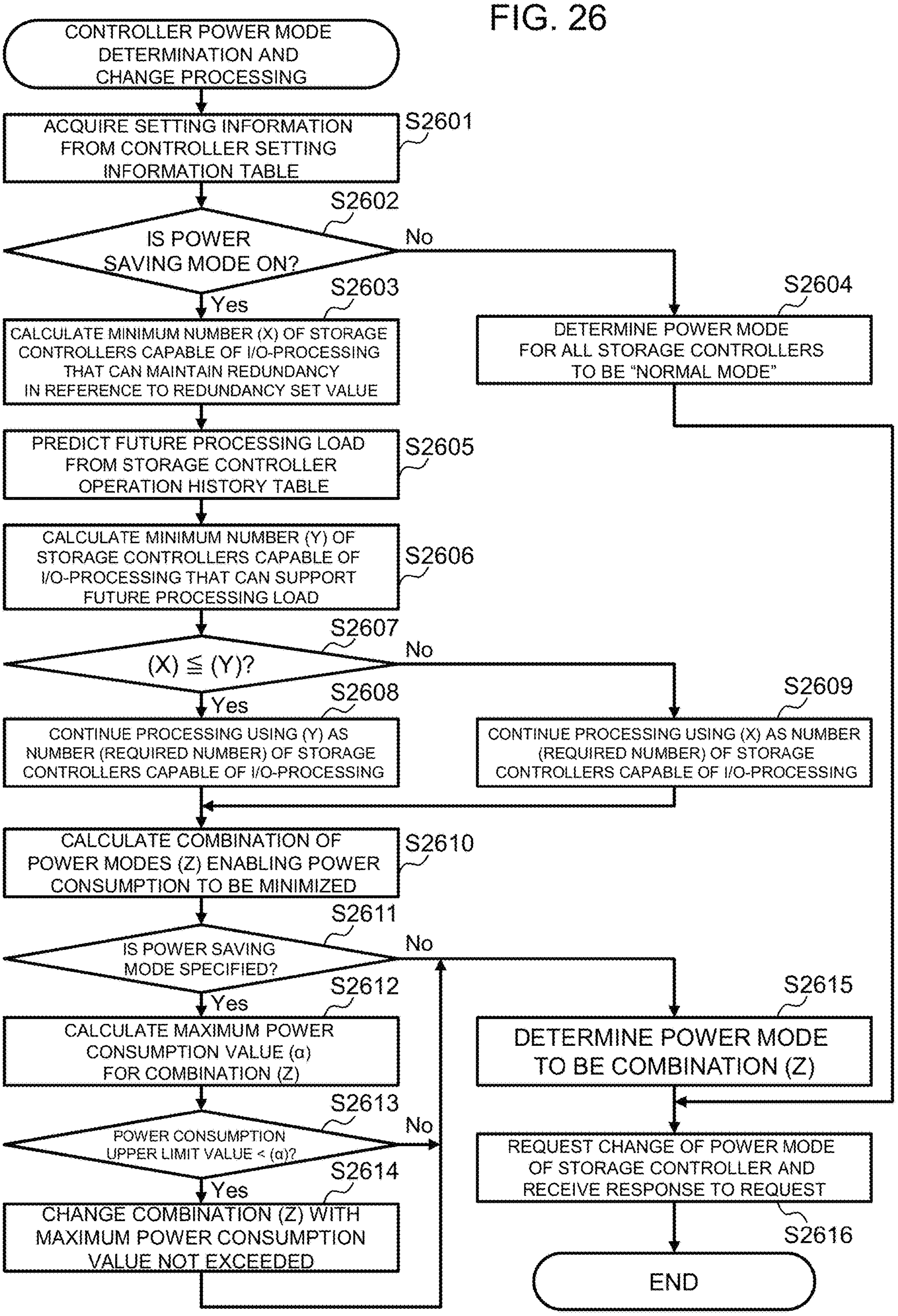
FIG. 26 is a flowchart illustrating an example of a procedure of controller power mode determination and change processing depicted in FIG. 24.

FIG. 26 is a flowchart illustrating an example of a procedure of controller power mode determination and change processing depicted in FIG. 24. The controller power mode determination and change processing indicates an example of processing performed in the storage system power consumption control processing (for example, step S2402 depicted in FIG. 24) in the management terminal 1505.

The CPU 1515 activates the controller power mode determination and change program 1704, and references the controller power setting information table 1803 to acquire setting information (power saving mode, redundancy set value, and power consumption upper limit value) (step S2601).

The controller power mode determination and change program 1704 determines, in reference to the information acquired in step S2601, whether or not the power saving mode of the storage system 1502 is on (that is, checks whether or not a power saving mode setting function of the storage system 1502 is deactivated). In a case where the result of the determination indicates that the power saving mode is on (step S2602: Yes), the procedure proceeds to step S2603. On the other hand, in a case where the result of the determination indicates that the power saving mode is OFF (step S2602: No), the procedure proceeds to step S2604.

The controller power mode determination and change program 1704 calculates the minimum number of storage controllers capable of the I/O processing that can maintain redundancy (X), in reference to the redundancy set value acquired in step S2601 (step S2603). Note that "storage controllers capable of the I/O processing" indicate controllers with a processing capability of not zero; the controller has a processing capability of not zero when the power mode is "power-OFF" or "standby mode." For example, in a case where the redundancy set value is 2-multiplex, (X) is 2. In a case where the redundancy set value is 3-multiplex, (X) is 3. Subsequently, the procedure proceeds to step S2605.

The controller power mode determination and change program 1704 determines the power modes of all the controllers 1506 of the storage system 1502 to be the "normal mode." Subsequently, the procedure proceeds to step S2616.

The controller power mode determination and change program 1704 references the controller operation history table 1802 to predict the future processing load (step S2605). For example, acquisition of the sampling time 2001 and the processing load 2005 enables a variation in the processing load on the device to be chronologically checked, allowing the future processing load to be predicted. Note that the future processing load may be predicted using information other than the controller operation history table 1802. The prediction may use, for example, the amount of variation in the number of logical volumes defined in the storage system 1502, the amount of variation in the number of connected hosts, or the like.

Subsequently, the controller power mode determination and change program 1704 calculates the minimum number of storage controllers capable of the I/O processing that can support the future processing load (Y) (step S2606). As this calculation method, for example, there can be employed a method in which the number of controllers required to support the future processing load is determined in reference to the maximum processing performance of the controller. That is, in a case where an apparatus using a general-purpose semiconductor device such as a storage controller is to provide a predetermined I/O processing capability, calculating, in reference to the maximum processing performance of the controller, the minimum number of controllers that can support the future processing load (Y) makes it possible to determine the conditions under which the storage system 1502 can execute the I/O processing of a required scale with performance degradation avoided, while minimizing power consumption. Note that, in the present embodiment, the controllers 1506 mounted in the storage system 1502 have substantially the same design performance. Further, for the calculation of the minimum number of controllers (Y) described above, margin may be provided to the assumed maximum processing performance or to the number of controllers (Y) itself.

The controller power mode determination and change program 1704 compares (X) determined in step S2603 with (Y) determined in step S2606, to determine whether or not (X)≤(Y) holds true (step S2607). In a case where the result of the determination indicates that (X)≤(Y) holds true (step S2607: Yes), the procedure proceeds to step S2608. On the other hand, in a case where the result of the determination indicates that (X)≤(Y) does not hold true (step S2607: No), the procedure proceeds to step S2609.

The controller power mode determination and change program 1704 determines the number of storage controllers capable of the I/O processing (required number) to be (Y) calculated in step S2606 and continues the processing (step S2608). Subsequently, the procedure proceeds to step S2610.

The controller power mode determination and change program 1704 determines the number of storage controllers capable of the I/O processing (required number) to be (X) calculated in step S2603 and continues the processing (step S2609). Subsequently, the procedure proceeds to step S2610.

The controller power mode determination and change program 1704 calculates the combination of power modes (Z) of the controllers 1506 that allows power consumption to be minimized (step S2610). For example, in some cases, when the processing loads can be concentrated on a particular controller 1506, a device that allows the processing load to be zeroed can be made, and combination with the power mode OFF allows provision of processing capability exceeding the predicted value of the future processing load while reducing power consumption compared to uniformization of the processing loads among the devices. However, to maintain redundancy, the combination is determined in such a manner that the controllers 1506 other than the above-described (required number)−1 of controllers 1506 are in a power mode other than the "power-OFF" and the "standby mode."

Further, for example, the number of storage controllers capable of the I/O processing determined in step S2608 or step S2609 is calculated in reference to the maximum processing performance of one controller 1506, and may thus have a margin for the predicted processing load. In such a case, the normal mode can be assigned to a particular controller 1506, whereas the power saving mode A or the power saving mode B can be assigned to the other controllers 1506. Note that any method can be adopted as this assignment method and one or more combinations for the assignment may be identified. At any rate, the combination of the power modes (Z) that can minimize power consumption is identified. Further, in a case where any of the controllers 1506 fails, at present, when any other controller 1506 is incapable of the I/O processing, the redundancy can be recovered by changing the other controller 1506 into a state in which the controller 1506 is capable of the I/O processing. At this time, with a shorter time (transition time) required for transition of the other controller 1506 to the state in which the other controller 1506 is capable of the I/O processing, the availability of the controller 1506 can be improved, and the length of time in which the processing capability decreases can be shortened. Accordingly, in the combination of the power modes involving any other controller 1506 being incapable of the I/O processing, setting one controller to the power mode of the "standby mode" enables the above-described transition time to be substantially shortened compared to the case of the "power-OFF."

The controller power mode determination and change program 1704 references the power saving mode setting information 2306 acquired in step S2601 (that is, accesses the controller power setting information table 1803) to determine whether or not the power saving mode is "specified" (step S2611). In a case where the result of the determination indicates that the power saving mode is "specified" (step S2611: Yes), the procedure proceeds to step S2612. On the other hand, in a case where the result of the determination indicates that the power saving mode is not "specified" (step S2611: No), the procedure proceeds to step S2615.

The controller power mode determination and change program 1704 calculates the maximum power consumption value (α) related to the combination of the power modes (Z) calculated in step S2610 (step S2612).

The controller power mode determination and change program 1704 determines whether or not the power consumption value (α) in the combination of the power modes (Z) calculated in step S2612 exceeds the power consumption upper limit value 2103 acquired in step S2601 (step S2613). In a case where the result of the determination indicates that the power consumption value (α) exceeds the power consumption upper limit value 2103 (step S2613: Yes), the procedure proceeds to step S2614. On the other hand, in a case where the result of the determination indicates that the power consumption value (α) does not exceed the power consumption upper limit value 2103 (step S2613: No), the procedure proceeds to step S2615.

The controller power mode determination and change program 1704 changes the combination of the power modes (Z) which is determined in step S2610 and which can minimize the power consumption, in such a manner that the power consumption value (α) does not exceed the power consumption upper limit value 2103 (step S2614). Specifically, the controller power mode determination and change program 1704 calculates the combination of the power modes (Z) in which the power consumption value (α) does not exceed the power mode upper limit value 2103 and that provides the highest processing capability when the number of storage controllers capable of the I/O processing (required number) is (X) determined in step S2603. In other words, the number of storage controllers capable of the I/O processing (X) that allows redundancy to be maintained with a reduction in power consumption prioritized is updated to the (required number), even in a case where the minimum number of storage controllers capable of the input/output processing that is predicted to be required to support a predicted processing load (Y) is larger than (X), and then the combination of the power modes that can provide the maximum processing performance is determined with the conditions for the power consumption upper limit value 2103 complied with. Subsequently, the procedure proceeds to step S2615. Note that, in an alternative configuration, whether or not a reduction in power consumption is prioritized may be checked with the user. For example, when a further reduction (for example, (X) is set to the (required number)) is determined to be required in connection with the power consumption upper limit value 2103 in a case where the (required number) has been determined in reference to (Y), the administrator of the storage system 1502 may be invited to check whether to accept or reject the reduction. Furthermore, in addition to or instead of checking whether to accept or reject the reduction, the user may be notified (warned) that the power mode that may fail to support the future processing load is set to avoid exceeding the power consumption upper limit value 2103. The provision of these notification functions allows the storage system 1502 to be provided in such a manner as to satisfy better convenience of the user and performance indexes (processing performance or reduction in power consumption) desired by the user.

The controller power mode determination and change program 1704 determines (Z) obtained in the above-described processing to be the combination of the power modes, and proceeds with the processing described below (step S2615). Note that, whereas the (Y) or (X) controllers 1506 are assigned the power mode in which the I/O processing can be executed, the controllers 1506 that are allowed to execute the I/O processing at the beginning of the controller power mode determination and change processing but are not included in (Y) and (X) described above transition to the standby mode or the power-OFF mode. Note that, for example, any criterion such as an operation history or an accumulated processing load can be adopted for a method for selecting (X) or (Y) controllers or selecting controllers to be excluded from the (X) or (Y) controllers.

The controller power mode determination and change program 1704 requests the storage system 1502 to change the power mode of the controller 1506, stands by for a completion response, and ends the processing upon receiving the completion response (step S2616). Note that, in changing the power mode of the controller 1506, the storage system 1502 needs to execute such processing as rebalance processing for the processing load between a plurality of the controllers 1506 and processing of changing a destination of an I/o processing request from the host machine 1503 and such processing is executed, for example, using a method in which, when the controller 1506 fails, another controller 1506 takes over the processing, or the like.

The storage system according to the present embodiment is a storage system including a storage apparatus that saves data in accordance with a data input/output request from a host or outputs the saved data, the storage system including a plurality of components (a plurality of controllers 1506) each configured to operate in a normal power mode or at least one power saving mode in a switchable manner, the power saving mode consuming less power than the normal power mode, the controller operating condition monitoring program 1703 as an example of a condition monitoring module that monitors an operating condition of each of the plurality of components, and a power mode control module (controller power mode determination and change program 1704) that determines a power mode of at least one particular component to be the power saving mode, according to a processing load which is related to each of the plurality of components and which corresponds to a result of monitoring by the controller operating condition monitoring program 1703 and that operates the at least one particular component in the power saving mode, in which the plurality of components perform mutual control with the storage apparatus in accordance with the data input/output request. This enables a reduction in power consumption without degrading the I/O performance between the storage system and the host.

The power consumption suppressing method according to the present embodiment is a power consumption suppressing method for a storage system including a storage apparatus that saves data in accordance with a data input/output request from a host or outputs the saved data, the power consumption suppressing method including a condition monitoring step by the controller operating condition monitoring program 1703 as an example of a condition monitoring module, an operating condition of each of a plurality of components each configured to operate in a normal power mode or at least one power saving mode in a switchable manner, the power saving mode consuming less power than the normal power mode, and a power mode control step of determining, by the controller power mode determination and change program 1704 as an example of a power mode control module, a power mode of at least one particular component to be the power saving mode, according to a processing load which is related to each of the plurality of components and which corresponds to a result of monitoring by the condition monitoring step, and operating the at least one particular component in the power saving mode, in which the plurality of components perform mutual control with the storage apparatus in accordance with the data input/output request.

In the present embodiment, the plurality of components described above are the plurality of controllers 1506 that control the data input/output processing between the storage system and the host, the storage system according to the present embodiment includes the management terminal 1505 that control the plurality of controllers, and the management terminal 1505 includes the controller operating condition monitoring program 1703 as an example of the condition monitoring module and the controller power mode determination and change program 1704 as an example of the power mode control module.

In the present embodiment, the controller power mode determination and change program 1704 selects, in reference to a redundancy setting (for example, tolerance for controller faults (N-multiplex)), a particular power mode that may transition, in response to detection of a fault occurring in any of the plurality of controllers 1506, to a state in which the other controllers can execute the input/output processing immediately after the detection. In this manner, even when a fault occurs in any of the controllers, the input/output processing can immediately be executed.

In the present embodiment, the controller power mode determination and change program 1704 enables the other controllers to transition to the state in which the input/output processing can be executed immediately after the detection, while operating some of CPU cores equipped with a plurality of cores, with the other cores kept standing by. In this manner, the CPU is operated with the minimum number of cores, enabling a further reduction in power consumption.

Further, the technique of changing the power consumption mode using the storage controller as a control unit as described in the present embodiment described above can be extended in terms of the control unit from the storage controller to the level of components of the storage system. Specifically, the concepts of the redundancy, the power-OFF mode, and the standby mode described in the second embodiment can be applied to the concept described in the first embodiment.

By way of example, in the system configuration depicted in FIG. 1, each of the CPUs 106 includes a plurality of cores 114 (four in the present figure), and the cores 114 included in one CPU have a redundant configuration. An example of this aspect is as follows.

For example, two of the four cores 114 included in the CPU 106 are set to an Active state (the I/O processing can be executed), whereas the remaining two cores 114 are set to a Standby state (the I/O processing is not allowed to be executed). Moreover, the Active state is also configured in such a manner that each of the cores 114 can be selectively set to a state in which functions are available without any special restriction on the Active state (normal Active) or a state in which such an approach as the power saving technology based on operating frequency change or voltage change control is applied (power saving Active). The setting of the Active state is assumed to be, for example, controlled and managed as described below.

The power mode setting for each core 114 (Active state) is performed in conjunction with the power mode of the controller 1506 described in the second embodiment. For example, in a case where the power mode of the controller 1506 is "normal," normal Active is applied to the cores in the Active state among the plurality of cores provided in the CPU included in the controller 1506. In a case where any one of the power saving modes is applied to the controller 1506, at least some of the cores in the Active state transition to the power saving Active state in association with the power saving mode of the controller 1506. Note that "at least some" means that, for satisfaction of conditions for the maximum power consumption accepted in the predetermined power saving mode set for the controller 1506, the cores in the Active state may be uniformly shifted to power saving Active or the cores continuing operation in normal Active may be combined with the cores transitioning to power saving Active. Further, by setting a plurality of cores to the multiple Active states in a multiplex manner, the functions in the CPU 106 can be made redundant. For example, even in a case where one of the cores in the Active state fails, the CPU 106 can use other cores in the Active state to continue processing for external components, allowing expectation of control of power consumption according to the processing load and improvement of fault resistance.

On the other hand, the setting of the Standby state is considered to be implemented by applying clock gating or power gating. The numbers of cores in the Active state and cores in the Standby state in the CPU can be optionally designed according to performance required for the controller. The difference between the Active state and the Standby state is, for example, whether or not a change of the power mode is applied in conjunction with the power mode applied to the controller as described above. In this example, the above-described conjunctive change operation applied to the cores in the Active state.

In this configuration, the cores in the Standby state are configured to be capable of operating as new cores in an Active state in response to a failure in one or more cores in the Active state making the redundancy related to the cores in the CPU below a freely set value. Note that, for an increased speed of switching from the Standby state to the Active state, preferably, at least one of the cores in the Standby state is subjected to power limitation by, for example, a power saving technology (clock gating) appropriate for high-speed setup, whereas the other cores are subjected to a reduction in power consumption by a technology such as power gating which is very effective in reducing power consumption. Such a configuration enables the availability of the CPU to be improved while contributing to power saving as a storage system.

Note that, for the settings of the Active state and the Standby state described above, the technique of power control applied to each core may vary between the two settings or at least a part of the technique may be applied to the two settings in common. Note that, even in a case where any core is in the Active state and is capable of the input/output processing, the CPU as a whole executes no I/O processing in a case where the state of the controller to which the CPU including the core belongs is in, for example, the standby mode or the power-OFF mode. Further, here, the power control and the redundancy in the multicore CPU have been described, but the described concepts can be applied to equipment included in the other controllers (particularly, equipment with multiplexing). In this case, power control (limitation of the maximum value of the applied voltage) related to target equipment that is different from clock gating and power gating can be used. Further, the clock gating and power gating described above in connection with the power control technology used in the present examples are mere examples, and the present invention is not limited to these.

Further, the power control related to the cores in the CPU described above can be implemented by using the functions of software via an operating system for the controller and a basic input/output system (BIOS) for the CPU to control related elements and circuits in the CPU. Further, for other equipment, the power control may be implemented using firmware and a driver specific to each piece of equipment.

Note that the present invention is not limited to the embodiments described above and includes many variations and equivalent configurations without departing from the gist of attached claims. For example, the above-described embodiments have been mentioned in detail to describe the present invention in an easy-to-understand manner, and the present invention is not necessarily limited to a configuration including all the described arrangements. For example, the "power mode control module" can be interpreted as a power mode control circuit or a power mode control function. Therefore, functional modules and means included in the embodiment described d above in the present invention may be implemented as dedicated devices using hardware resources, as electronic circuits on a substrate, or as functions of software or a program, or by a combination of those means. Further, the elements described in the present embodiment in parallel may be in a form in which at least one of the elements is connected in series with the other elements.

The present invention can be applied to a storage system related to a technology of suppressing power consumption according to the power mode of each of the devices mounted in at least one controller.

What is claimed is:

1. A storage system including a storage apparatus that saves data in accordance with a data input/output request from a host or outputs the saved data, the storage system comprising:

a plurality of components each configured to operate in a first power mode or at least one second power mode in a switchable manner, the second power mode consuming less power than the first power mode;

a condition monitoring module that monitors an operating condition of each of the plurality of components;

a power mode control module that determines a power mode of at least one particular component to be the second power mode, according to a processing load which is related to each of the plurality of components and which corresponds to a result of monitoring by the condition monitoring module, and operates the at least one particular component in the power saving mode, wherein a combination of the power modes is determined based on power amount consumed by a combination of the power modes of the plurality of components, wherein the plurality of components are a plurality of controllers that control the data input/output processing between the storage system and the host, and include a management terminal that controls the plurality of controllers, and the management terminal includes the condition monitoring module, and the power mode control module, wherein the plurality of controllers consist of at least one controller capable of I/O processing configured to maintain redundancy and a processing load equal or below a predetermined processing load value, wherein the power mode control module selects, based on a redundancy setting, a power mode configured to transfer to a state where input/output processing is performed on another controller immediately after the fault, in response to a detection of a fault caused in any one of the plurality of controllers, wherein at least a portion of the plurality of components can be configured to a power mode in which input/output processing can be performed by another component upon occurrence of a failure and wherein the power mode control section is configured to determine a combination of power modes including a power mode based on power consumption.

2. The storage system according to claim 1, wherein the plurality of components are a plurality of devices that control data input/output processing between the storage system and the host, the storage system further includes at least one controller that is equipped with the plurality of devices and that controls the data input/output processing between the storage system and the host, the controller includes the condition monitoring module, and the power mode control module.

3. The storage system according to claim 1, wherein the device management table manages power consumption and processing capability in each of the first power mode and the second power mode for each group of the plurality of devices, and the power mode control module determines the power mode of the particular component to be the second power mode and changes the power mode of the particular component to the second power mode according to the power consumption and processing capability in each of the first power mode and the second power mode for each group of the plurality of devices managed in the device management table.

4. The storage system according to claim 1, wherein the device management table manages a power control unit that defines a first category in which control of the power mode for the plurality of devices is performed independently of control of the power mode for other devices and a second category in which control of the power mode for the plurality of devices is performed in combination with control of the power mode for other devices.

5. The storage system according to claim 4, wherein the device management table manages, as the power control unit, a device unit including devices independent of the other devices in terms of power consumption, a connection destination unit including devices for which the power mode is to be changed in line with the other devices, and a controller unit including a controller group in which each group of a plurality of the controllers is to provide substantially similar performance.

6. The storage system according to claim 1, wherein the power mode control module classifies, in a case where there are a plurality of devices for which the grouping is enabled, the devices into a first device group in which a manner of changing the power mode is to be the same for the plurality of devices subjected to the grouping and a second device group in which the manner of changing the power mode need not be the same for the plurality of devices subjected to the grouping, and for the first device group, changes the power modes of the devices to the same changed power mode.

7. The storage system according to claim 4, wherein the power mode control module classifies the devices into devices that accept power-OFF as the second power mode and devices that do not accept power-OFF as the second power mode, and for the devices that accept power-OFF as the second power mode, switches the power mode to power-OFF depending on a result of monitoring by the condition monitoring module, while switching, for the devices that do not accept power-OFF as the second power mode, the power mode to the second power mode depending on the result of monitoring by the condition monitoring module.

8. The storage system according to claim 1, wherein the power mode control module operates a first portion of CPU (Central Processing Unit) cores equipped with multiple cores, and a second portion of the CPU cores in a standby state while allowing the another controller to transfer to the state where input/output processing can be performed.

9. A power consumption suppressing method for a storage system including a storage apparatus that saves data in accordance with a data input/output request from a host or outputs the saved data, the power consumption suppressing method comprising:

a condition monitoring step of monitoring, by a condition monitoring module, an operating condition of each of a plurality of components each configured to operate in a first power mode or at least one second power mode in a switchable manner, the second power mode consuming less power than the first power mode; and a power mode control step of determining, by a power mode control module, a power mode of at least one particular component to be the second power mode, according to a processing load which is related to each of the plurality of components and which corresponds to a result of monitoring by the condition monitoring step, and operating the at least one particular component in the power saving mode, wherein a combination of the power modes is determined based on a power amount consumed by a combination of power modes of the plurality of components, wherein the plurality of components are a plurality of controllers that control the data input/output processing between the storage system and the host, and include a management terminal that controls the plurality of controllers, and the management terminal includes the condition monitoring module, and the power mode control module, wherein the plurality of controllers consist of at least one controller capable of I/O processing configured to maintain redundancy and a processing load equal or below a predetermined processing load value, further comprising a step of selecting by the power mode control module, based on a redundancy setting, a power mode configured to transfer to a state where input/output processing is performed on another controller immediately after the fault, in response to a detection of a fault caused in any one of the plurality of controllers, wherein at least a portion of the plurality of components can be configured to a power mode in which input/output processing can be performed by another component upon occurrence of a failure and further comprising determining by the power mode control section a combination of power modes including a power mode based on power consumption.

* * * * *